United States Patent
Naka et al.

(10) Patent No.: US 9,037,184 B2
(45) Date of Patent: May 19, 2015

(54) WIRELESS COMMUNICATION SYSTEM, FEMTOCELL BASE STATION AND TRANSMISSION POWER CONTROL METHOD

(75) Inventors: Katsuyoshi Naka, Osaka (JP); Toyoki Ue, Kanagawa (JP); Takeshi Kanazawa, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 331 days.

(21) Appl. No.: 13/634,768

(22) PCT Filed: Mar. 23, 2011

(86) PCT No.: PCT/JP2011/001712
§ 371 (c)(1),
(2), (4) Date: Sep. 13, 2012

(87) PCT Pub. No.: WO2011/118212
PCT Pub. Date: Sep. 29, 2011

(65) Prior Publication Data
US 2013/0005388 A1 Jan. 3, 2013

(30) Foreign Application Priority Data
Mar. 25, 2010 (JP) .................... 2010-070459

(51) Int. Cl.
*H04B 7/00* (2006.01)
*H04W 52/24* (2009.01)
*H04W 24/10* (2009.01)
*H04W 84/04* (2009.01)
*H04W 28/04* (2009.01)
*H04W 52/14* (2009.01)
*H04W 88/08* (2009.01)
*H04W 92/20* (2009.01)

(52) U.S. Cl.
CPC ............ *H04W 52/244* (2013.01); *H04W 24/10* (2013.01); *H04W 52/247* (2013.01); *H04W 84/045* (2013.01); *H04W 28/048* (2013.01); *H04W 52/143* (2013.01); *H04W 88/08* (2013.01); *H04W 92/20* (2013.01)

(58) Field of Classification Search
USPC .......... 455/67.11, 67.13, 63.1, 443, 444, 446, 455/449, 450–453, 522, 69–70; 370/315–320
See application file for complete search history.

(56) References Cited

U.S. PATENT DOCUMENTS

2012/0295629 A1* 11/2012 Lee et al. .................. 455/450

OTHER PUBLICATIONS

3GPP TR25.967v8.0.1 (Mar. 2009) "Home Node B Radio Frequency (RF) Requirements (FDD)".
3GPP R4-093619 (Oct. 2009), Kyocera, "Network Assisted Home eNodeB Transmission power control in Downlink".
3GPP TR25.967 (May 2009) "Home Node B Radio Frequency (RF) Requirements (FDD)".
International Search Report for PCT/JP2011/001712 dated May 17, 2011.

* cited by examiner

*Primary Examiner* — Fayyaz Alam
(74) *Attorney, Agent, or Firm* — Pearne & Gordon LLP

(57) ABSTRACT

A wireless terminal transmits a result of measuring received power of a downlink wireless signal from a femtocell base station to a macrocell base station. The macrocell base station transmits an interference control request including identification information of the wireless terminal to a femtocell base station group of which received power of a downlink signal included in a measurement result transmitted from the wireless terminal is a predetermined value or more. The femtocell base station has an adjacent wireless terminal list in which identification information of a wireless terminal, which is capable of being connected to an adjacent femtocell base station but is not capable of being connected to the femtocell base station, is recorded, and downlink transmission power of the femtocell base station is reduced when the identification information included in the interference control request is included in this list.

20 Claims, 16 Drawing Sheets

FIG. 13

| MESSAGE TYPE | ID OF INTERFERENCE CONTROL REQUEST DESTINATION HNB | ID OF INTERFERENCE CONTROL REQUEST SOURCE MACROCELL TERMINAL | RSP OF INTERFERENCE CONTROL REQUEST DESTINATION HNB | RSP OF MACROCELL TERMINAL CONNECTABLE HNB |

WIRELESS COMMUNICATION SYSTEM, FEMTOCELL BASE STATION AND TRANSMISSION POWER CONTROL METHOD

TECHNICAL FIELD

The present invention relates to a wireless communication system, a femtocell base station and a transmission power control method which are capable of reducing interference of a downlink wireless line between adjacent femtocell base stations.

BACKGROUND ART

It has been considered to introduce an ultra-compact wireless base station (hereinafter, referred to as a "femtocell base station (HNB: Home Node B)") into a cellular system represented by WCDMA (Wideband Code Division Multiple Access) or LTE (Long Term Evolution). The femtocell base station can cover an area of appropriately several meters in radius (hereinafter, referred to as a "femtocell"). The femtocell base station is installed within, for example, buildings such as ordinary households or offices having relatively bad propagation environment. In this manner, in the cellular system, a speeding up of wireless transmission within the femtocell is anticipated even in an area having bad propagation environment.

In existing cellular systems, it is assumed that a conventional wireless base station (hereinafter, referred to as a "macrocell base station (MNB: Macro Node B)") uses the entire frequency band of telecommunications carriers in urban areas. Therefore, it is difficult to secure an exclusive frequency band for the femtocell base station. In this case, the femtocell base station is introduced in a form in which frequency is shared with an existing macrocell base station. Further, in an area where the femtocell base stations are densely installed, it is assumed that a plurality of femtocell base stations are operated by sharing a frequency. In addition, it is also assumed that an operation to which an access restriction is added is performed in a CSG (Closed Subscriber Group) mode capable of communicating using the femtocell base station by only subscribers or registrants of the femtocell base station.

When the femtocell base station is introduced into the existing cellular system on the basis of these conditions, there is a problem of mutual interference between downlink wireless lines provided for a wireless terminal (MUE: Macro User Equipment) connected to the existing macrocell base station from the femtocell base station and a wireless terminal (HUE: Home User Equipment) connected to the femtocell base station from the existing macrocell base station. Meanwhile, the wireless terminal connected to the macrocell base station is sometimes called a "macrocell user", and the wireless terminal connected to the femtocell base station is sometimes called a "femtocell user".

In addition, there is a problem of mutual interference between downlink wireless lines provided for a femtocell user (for example, a user of the femtocell base station installed on the adjacent house) who has not obtained access authorization from the femtocell base station. When such mutual interference between downlink wireless lines is generated, the effective communication range (effective coverage) of the femtocell base station is reduced, and the throughput of the downlink wireless line of the entire femtocell is lowered.

FIG. 14 is a diagram illustrating an example of a configuration of a wireless system in which a femtocell base station is installed within a coverage area of a macrocell base station (hereinafter, referred to as a "macrocell"). A macrocell base station (MNB) 100 forms a macrocell 101 that covers a wide area of which the cell radius is appropriately 0.5 kilometers to several kilometers. In the wireless system shown in FIG. 14, the macrocell user (MUE) 102 within the macrocell 101 communicates with the macrocell base station 100 using a wireless line such as WCDMA, LTE or WLAN. In addition, a femtocell base station (HNB) 110 is installed at an arbitrary position within the macrocell 101, and a femtocell 111 which is a range capable of communicating with the femtocell base station 110 is formed. When a wireless terminal which is an installer or a registrant of the femtocell base station 110 is located within the femtocell 111, and the reception quality of a downlink wireless signal from the femtocell base station 110 is above a certain level, the wireless terminal communicates with the femtocell base station 110 as a femtocell user (HUE) 112. In the example shown in FIG. 14, another femtocell base station (HNB) 120 different from the femtocell base station 110 is installed in the vicinity of the femtocell base station 110, and communicates with a femtocell user (HUE) 122 by forming a femtocell 121. Meanwhile, the macrocell base station (MNB), the femtocell base station (HNB), the macrocell user (MUE) and the femtocell user (HUE) communicate with each other using the same communication system (WCDMA, LTE, WLAN and the like). Meanwhile, an LTE-capable macrocell base station is sometimes called "MeNB", and an LTE-capable femtocell base station is sometimes called "HeNB". In addition, a wireless base station is sometimes called an access point (AP).

In NPL 1, an interference control method of a downlink wireless line in a femtocell base station is disclosed as a method of reducing mutual interference when the femtocell base station shares frequency with the existing macrocell base station. In this interference control method, transmission power of a femtocell base station (HNB) is set on the basis of the range of a coverage hole (area in which a macrocell user (MUE) is not capable of communicating with a macrocell base station (MNB)) of a macrocell formed by the femtocell base station and the range of a target coverage of the femtocell base station (HNB) itself.

FIG. 15 is a sequence diagram of the interference control method disclosed in NPL 1. As shown in FIG. 15, a notification signal (BCH: Broadcast CHannel) and a reference signal (RS: Reference Signal) are periodically transmitted from a macrocell base station (MNB) 202 toward the entire macrocell (ST201), and a femtocell base station (HNB) 201 installed within the macrocell receives the notification signal and the reference signal (BCH/RS). The femtocell base station (HNB) 201 measures reference signal received power (RSRP: Reference Signal Received Power) (ST202). Meanwhile, the reference signal is sometimes called "CPICH (Common Pilot CHannel)". At this time, the reference signal received power is called "RSCP (Received Signal Code Power)". The femtocell base station (HNB) 201 calculates a transmission power value of the femtocell base station (HNB) 201 (permissible transmission power value in relation to a macrocell) on the basis of RSRP measured in step ST202 and the range of a coverage hole permitted by the femtocell base station (HNB) 201 with respect to the macrocell (ST203). Specifically, the transmission power value of the femtocell base station (HNB) 201 is determined so that the reception quality of the reference signal by the macrocell user (MUE) from the macrocell base station (MNB) in a point (macrocell coverage hole) of which a propagation loss from the femtocell base station (HNB) 201 is X [dB] is above a certain value (for example, CPICH_Ec/No is −18 [dB] or more, or RSRP/RSSI is −6 [dB] or more). Meanwhile, "CPICH_Ec" indicates received energy per chip of CPICH, "No" indicates noise energy including an interference signal, and "RSSI (Received Signal Strength Indicator)" indicates total received power of a received signal. When RSRP of the macrocell user (MUE) is approximated by RSRP measured by the femtocell base station (HNB) 201, and RSSI approximates a value obtained by adding a propagation loss to transmission power of the femtocell base station (HNB) 201, the estimated reception quality of the macrocell user (MUE) can be calculated in the femtocell base station (HNB) 201. In order to satisfy the reception quality of the macrocell user (MUE), the transmission power of the femtocell base station (HNB) 201 is set to be small in the edge of the macrocell, and is set to be large in the vicinity of the macrocell. In addition, the femtocell base station (HNB) 201 calculates a desired transmission power value (femto desired transmission power value) of the femtocell base station (HNB) 201 from the range (for example, Y[dB]) of the target coverage of the femtocell base station (HNB) 201 itself and the RSRP measurement value of the macrocell (ST204). Next, the femtocell base station (HNB) 201 determines a femto operational transmission power value which is actually set, from the versus-macrocell permissible transmission power value calculated in step ST203 and the femto desired transmission power value calculated in step ST204 (ST205). Specifically, minimum values of the versus-macrocell permissible transmission power value and the femto desired transmission power value are selected. Thereby, while performing the interference reduction on the macrocell, it is possible to perform a control of the femtocell base station of which the coverage area is not excessively wide. The femtocell base station (HNB) 201 determines the transmission power of the notification signal and the reference signal on the basis of the determined femto operational transmission power value, and periodically transmits the notification signal and the reference signal (BCH/RS) to the entire femtocell (ST206).

In addition, NPL 2 discloses a further interference reduction method when an unregistered macrocell user in a femtocell base station enters a macrocell coverage hole. In the interference reduction method, a macrocell base station causes the femtocell base station to control transmission power by issuing power reduction request signaling to the femtocell base station which is an interference source, from a result of a received power measurement of a neighboring cell of the macrocell user receiving interference of a downlink wireless line from the femtocell base station.

FIG. 16 is a sequence diagram of the interference control method disclosed in NPL 2. As shown in FIG. 16, a notification signal and a reference signal (BCH/RS) which are specific to a cell are periodically transmitted from a femtocell base station (HNB) 301, a femtocell base station (HNB) 302 and a macrocell base station (MNB) 303, respectively (step ST301). Meanwhile, since each of the base stations has timing, the transmissions of BCH/RS are not necessarily at the completely same timing. A macrocell user (MUE) 304 measures each RSRP of the macrocell base station (MNB) 303 which is a serving cell and the neighboring cell detected by performing a neighboring cell search (step ST302). Meanwhile, the neighboring cell search performed by the macrocell user (MUE) 304 is based on a received result of a synchronization channel (SCH: Synchronization Channel), not shown, periodically transmitted from each base station using the downlink wireless line. The macrocell user (MUE) 304 reports the measurement result of RSRP of each cell to the macrocell base station (MNB) 303 which is a serving cell (step ST303). When the cell having the strongest RSRP except for the serving cell is a femtocell, the macrocell base station (MNB) 303 determines the other party's base station that issues an interference control request for asking the femtocell base station (HNB 302 in FIG. 16) for an interference reduction, on the basis of the reported measurement result (step ST304), and sends the interference control request (step ST305). Meanwhile, an identifier of the macrocell user (MUE) 304 may be included in the interference control request. The femtocell base station (HNB) 302 receiving the interference control request confirms a list of wireless terminals (hereinafter, referred to as a "CSG UE list") providing access permission to a local station (step ST306). The femtocell base station (HNB) 302 reduces transmission power of the local station when the identifier of the macrocell user (MUE) 304 included in the interference control request is not included in the CSG UE list (step ST307), and maintains a transmission power value when the identifier thereof is included in the CSG UE list.

The following effects (1) and (2) are obtained by performing the downlink transmission power control of the femtocell base station based on a macrocell reference in this manner. As the effect (1), the coverage hole of the macrocell and the coverage of the femtocell can be formed to be almost the same as each other even in any of the places within the macrocell. As the effect (2), the femtocell base station in which the coverage hole is formed reduces the transmission power with respect to the macrocell user entering the coverage hole of the macrocell, thereby allowing the amount of interference of the downlink wireless line with the macrocell user to be reduced, and allowing the connection of the macrocell user to the macrocell base station to be maintained.

CITATION LIST

Non Patent Literatures

[NPL 1] 3GPP TR25.967v8.0.1 (2009-03) "Home Node B Radio Frequency (RF) Requirements (FDD)"
[NPL 2] 3GPP R4-093619 (2009-10), Kyocera, "Network Assisted Home eNodeB Transmission power control in Downlink"

SUMMARY OF INVENTION

Technical Problem

In the interference control technique described above, the femtocell base station installed within a macrocell performs a reduction in the downlink transmission power on the basis of a macrocell reference, thereby allowing interference provided for the downlink wireless line from the macrocell base station to the macrocell user to be reduced. However, the interference control technique takes no measure for the interference of the downlink wireless line from the adjacent femtocell base station to the femtocell user, in a situation in which a plurality of femtocell base stations are installed at a distance where each femtocell overlaps each other.

FIG. 17 is a diagram illustrating an example of a coverage hole of one femtocell formed when each femtocell base station performs a downlink transmission power reduction control based on a macrocell reference, in a situation in which two femtocell base station are installed at a distance where each femtocell overlaps each other. Meanwhile, each femtocell base station is installed in an area such as an adjacent room or a house. In the example shown in FIG. 17, a femtocell base station (hereinafter, referred to as a "local station femtocell base station") HNB02 is installed within an area (hereinafter referred to as a "local area") A2, and another femtocell base station (hereinafter, referred to as an "adjacent femtocell base station") HNB01 is installed within an area (hereinafter referred to as an "adjacent area") A1 adjacent to the local area A2.

According to the above-mentioned interference control technique, when an adjacent femtocell user HUE01 which is being connected to a macrocell base station MNB comes close to the adjacent area A1 from the local area A2 side, a local station femtocell base station HNB02 does not include an identifier of the wireless terminal HUE01 in the CSG UE list of the local station, and thus an initial value of the downlink transmission power is reduced as shown in FIG. 18. As a result, the coverage of the local station femtocell base station HNB02 changes from the dotted-line circle shown in FIG. 17 to the solid-line circle.

However, even when the local station femtocell base station HNB02 performs a reduction in the downlink transmission power based on such a macrocell reference, there may be a case where a coverage hole is formed in an adjacent femtocell of the adjacent area A1 due to a downlink wireless signal of the local station femtocell base station HNB02. When the adjacent femtocell user HUE01 is present in the coverage hole, the adjacent femtocell user HUE01 cannot be connected to the adjacent femtocell base station HNB01 even in a case where it is present in the adjacent area A1. For example, as shown in FIG. 17, when the adjacent femtocell user HUE01 returns to the house of the adjacent area A1, the adjacent femtocell user HUE01 cannot be connected to the adjacent femtocell base station HNB01 insofar as it is present in the coverage hole shown by an oblique line. Meanwhile, the coverage hole depends to a large extent on a location of the local station femtocell base station HNB02 in the local area A2 and a location of the adjacent femtocell base station HNB01 in the adjacent area A1.

An object of the present invention is to provide a wireless communication system, a femtocell base station and a transmission power control method which are capable of reducing interference of a downlink wireless line between adjacent femtocell base stations.

Solution to Problem

According to the present invention, there is provided a wireless communication system including: a macrocell base station; a plurality of femtocell base stations which are capable of communicating with the macrocell base station; and a wireless terminal which is capable of wirelessly communicating with the macrocell base station and at least one of the plurality of femtocell base stations, wherein the wireless terminal transmits a result of measuring received power of a downlink wireless signal from a femtocell base station located in the vicinity of the wireless terminal to the macrocell base station, the macrocell base station transmits an interference control request including identification information of the wireless terminal to a femtocell base station group of which the received power of the downlink wireless signal included in a measurement result transmitted from the wireless terminal is a predetermined value or more, the femtocell base station has an adjacent wireless terminal list in which identification information of a wireless terminal, which is capable of being connected to an adjacent femtocell base station adjacent to the femtocell base station but is not capable of being connected to the local station, is recorded, and reduces downlink transmission power when the identification information of the wireless terminal included in the interference control request is included in the adjacent wireless terminal list.

In the above-mentioned wireless communication system, the femtocell base station has a local station wireless terminal list in which identification information of a wireless terminal capable of being connected to the femtocell base station is recorded, and the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

In the above-mentioned wireless communication system, a received power value of a downlink wireless signal from each station included in the femtocell base station group to the wireless terminal is included in the interference control request, and the femtocell base station refers to the interference control request, and reduces the downlink transmission power of the femtocell base station when the received power of the downlink wireless signal from the femtocell base station to the wireless terminal is larger than the received power of the downlink wireless signal from the adjacent femtocell base station to the wireless terminal.

In the above-mentioned wireless communication system, the femtocell base station further reduces the downlink transmission power thereof only when the identification information of the wireless terminal included in the interference control request is not included in the local station wireless terminal list, and both the received power of the downlink wireless signal from the femtocell base station to the wireless terminal and the received power of the downlink wireless signal from the adjacent femtocell base station to the wireless terminal are a predetermined value or more.

In the above-mentioned wireless communication system, the femtocell base station reduces the downlink transmission power thereof in a range in which a connection to the wireless terminal which is being connected to the femtocell base station is maintained.

In the above-mentioned wireless communication system, the femtocell base station reduces the downlink transmission power thereof when the received power of the downlink wireless signal from the femtocell base station to the wireless terminal increases.

In the above-mentioned wireless communication system, the wireless terminal has an adjacent femtocell base station list in which identification information of a femtocell base station adjacent to a femtocell base station to which the wireless terminal is capable of being connected is recorded, and only in a case where a first received power value of the downlink wireless signal from the femtocell base station, to which the wireless terminal is capable of being connected, to the wireless terminal and a second received power value of the downlink wireless signal from the femtocell base station included in the adjacent femtocell base station list to the wireless terminal are a predetermined value or more, and the second received power value is larger than the first received power value, the wireless terminal transmits the first received power value and the second received power value to the macrocell base station.

According to the present invention, there is provided a wireless communication system including: a plurality of femtocell base stations; and a wireless terminal which is capable of communicating with at least one of the plurality of femtocell base stations, wherein the wireless terminal transmits an interference control request, including identification information of the wireless terminal to a femtocell base station having maximum received power in received power of a downlink wireless signals from femtocell base stations located in the vicinity of the wireless terminal, and located in the vicinity of a femtocell base station to which the wireless terminal is capable of being connected, the femtocell base station has an adjacent wireless terminal list in which identification information of a wireless terminal, which is capable of being connected to an adjacent femtocell base station adjacent to the femtocell base station but is not capable of being connected to the femtocell base station, is recorded, and the femtocell base station reduces downlink transmission power thereof when the identification information of the wireless terminal included in the interference control request is included in the adjacent wireless terminal list.

According to the present invention, there is provided a femtocell base station which is capable of communicating with a wireless terminal and a macrocell base station capable of communicating with the wireless terminal, including: an adjacent wireless terminal list in which identification information of a wireless terminal, which is capable of being connected to an adjacent femtocell base station adjacent to the femtocell base station but is not capable of being connected to the femtocell base station, is recorded, wherein downlink transmission power of the femtocell base station is reduced when identification information of a wireless terminal included in an interference control request transmitted from the wireless terminal or the macrocell base station is included in the adjacent wireless terminal list.

The above-mentioned femtocell base station includes a local station wireless terminal list in which identification information of a wireless terminal capable of being connected to the femtocell base station is recorded, and the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

In the above-mentioned femtocell base station, a received power value of a downlink wireless signal from each station included in the femtocell base station group to the wireless terminal is included in the interference control request, and the downlink transmission power of the femtocell base station is reduced, with reference to the interference control request, when the received power of the downlink wireless signal from the femtocell base station to the wireless terminal is larger than the received power of the downlink wireless signal from the adjacent femtocell base station to the wireless terminal.

The above-mentioned femtocell base station further reduces the downlink transmission power of the femtocell base station only when the identification information of the wireless terminal included in the interference control request is not included in the local station wireless terminal list, and both the received power of the downlink wireless signal from the femtocell base station to the wireless terminal and the received power of the downlink wireless signal from the adjacent femtocell base station to the wireless terminal are a predetermined value or more.

The above-mentioned femtocell base station reduces the downlink transmission power in a range in which a connection to the wireless terminal which is being connected to the femtocell base station is maintained.

The above-mentioned femtocell base station reduces the downlink transmission power of the femtocell base station when the received power of the downlink wireless signal from the femtocell base station to the wireless terminal increases.

According to the present invention, there is provided a transmission power control method performed by a femtocell base station which is capable of communicating with a wireless terminal and a macrocell base station capable of communicating with the wireless terminal, wherein the femtocell base station having an adjacent wireless terminal list in which identification information of a wireless terminal, which is capable of being connected to an adjacent femtocell base station adjacent to the femtocell base station but is not capable of being connected to the femtocell base station, is recorded reduces downlink transmission power when identification information of a wireless terminal included in an interference control request transmitted from the wireless terminal or the macrocell base station is included in the adjacent wireless terminal list.

In the above-mentioned transmission power control method, the femtocell base station has a local station wireless terminal list in which identification information of a wireless terminal capable of being connected to the femtocell base station is recorded, and the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

In the above-mentioned transmission power control method, a received power value of a downlink wireless signal from each station included in the femtocell base station group to the wireless terminal is included in the interference control request, and the femtocell base station refers to the interference control request, and reduces the downlink transmission power of the femtocell base station when the received power of the downlink wireless signal from the femtocell base station to the wireless terminal is larger than the received power of the downlink wireless signal from the adjacent femtocell base station to the wireless terminal.

In the above-mentioned transmission power control method, the femtocell base station further reduces the downlink transmission power of the femtocell base station only when the identification information of the wireless terminal included in the interference control request is not included in the local station wireless terminal list, and both the received power of the downlink wireless signal from the femtocell base station to the wireless terminal and the received power of the downlink wireless signal from the adjacent femtocell base station to the wireless terminal are a predetermined value or more.

In the above-mentioned transmission power control method, the femtocell base station reduces the downlink transmission power in a range in which a connection to the wireless terminal which is being connected to the femtocell base station is maintained.

In the above-mentioned transmission power control method, the femtocell base station reduces the downlink transmission power of the femtocell base station when the received power of the downlink wireless signal from the femtocell base station to the wireless terminal increases.

Advantageous Effects of Invention

According to a wireless communication system, a femtocell base station and a transmission power control method of the present invention, it is possible to reduce interference of a downlink wireless line between adjacent femtocell base stations. That is, it is possible to improve connectivity to an adjacent femtocell base station by a wireless terminal capable of being connected to an adjacent femtocell base station, while minimizing the influence on a wireless terminal capable of being connected to the femtocell base station by a reduction in coverage of the femtocell base station femtocell base station.

BRIEF DESCRIPTION OF DRAWINGS

FIG. 13 is a conceptual diagram illustrating a data configuration of an interference control request.

DESCRIPTION OF EMBODIMENTS

Hereinafter, embodiments of the invention will be described with reference to the drawings.

First Embodiment

Figure 1:
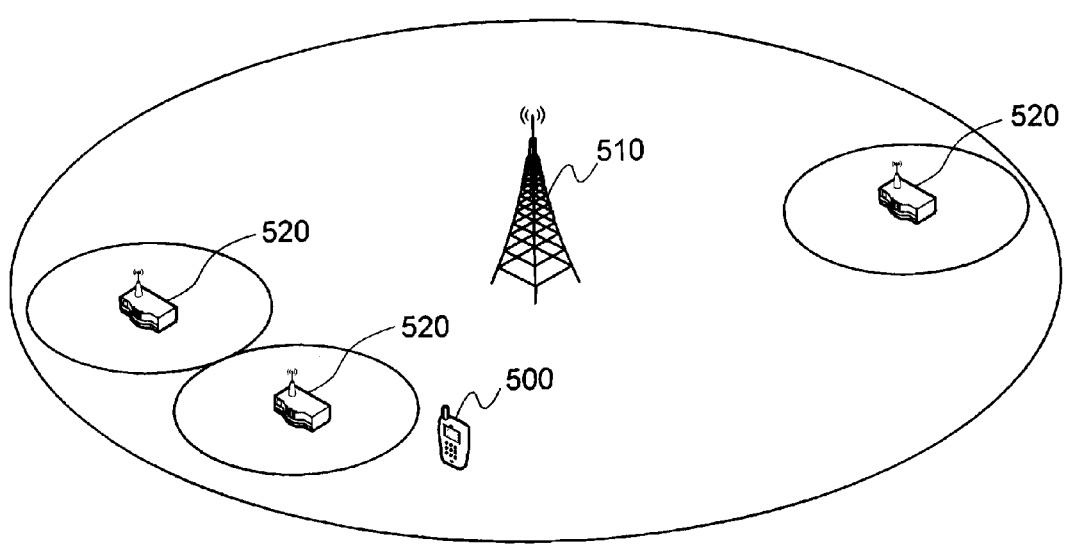
FIG. 1 is a block diagram illustrating a configuration of a wireless communication system according to a first embodiment of the invention.
Figure 2:
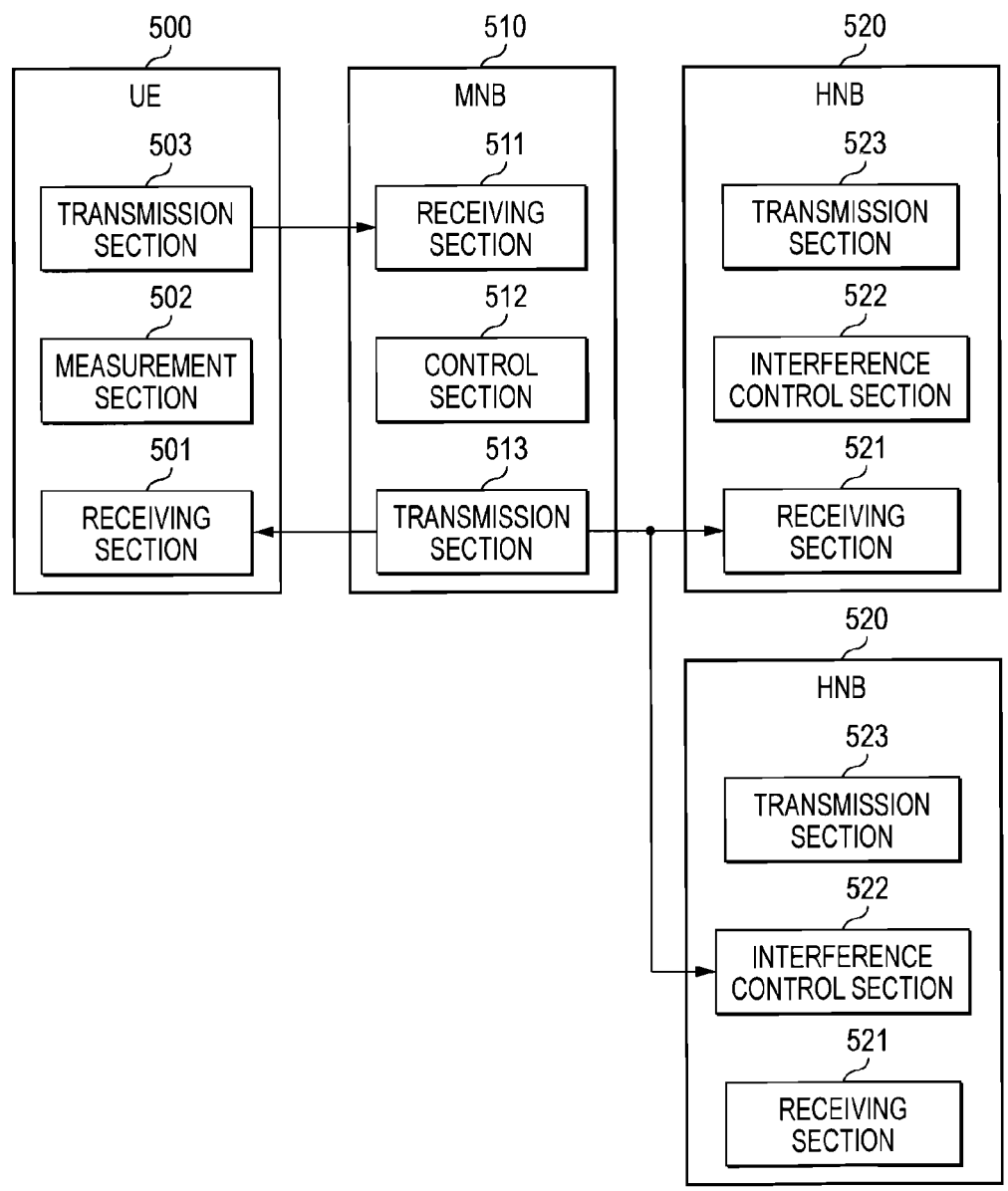
FIG. 2 is a block diagram illustrating each configuration of a wireless terminal, a macrocell base station and femtocell base stations which are included in the wireless communication system according to the first embodiment.

FIG. 1 is a block diagram illustrating a configuration of a wireless communication system according to a first embodiment of the invention. FIG. 2 is a block diagram illustrating each configuration of a wireless terminal, a macrocell base station and femtocell base stations which are included in the wireless communication system according to the first embodiment.

The wireless communication system according to the first embodiment shown in FIG. 1 includes a wireless terminal (UE) 500, a macrocell base station (MNB) 510, and a plurality of femtocell base stations (HNB) 520. Meanwhile, the terminal and the base stations are operated by the same communication system (for example, WCDMA, LTE, WLAN and the like).

As shown in FIG. 2, the wireless terminal (UE) 500 includes a receiving section 501, a measurement section 502, and a transmission section 503. In FIG. 1, the wireless terminal 500 receives an offer of a downlink communication service from the macrocell base station 510.

The receiving section 501 receives a downlink received signal from the macrocell base station 510. In addition, the receiving section 501 receives reference signals or notification information transmitted from the macrocell base station 510, a plurality of femtocell base stations 520 and a peripheral macrocell base station which is not shown.

The measurement section 502 measures reference signal received power (RSRP or RSCP). Meanwhile, the measurement of the reference signal received power is performed targeting the macrocell base station 510 which is a serving cell, another peripheral macrocell base station and the femtocell base station. The peripheral base station is detected by a neighboring cell search.

The transmission section 503 reports a measurement result of the received power, measured by the measurement section 502, to the connected macrocell base station 510. Meanwhile, the transmission section 503 also reports an identifier of the wireless terminal 500 included in the measurement result.

As shown in FIG. 2, the macrocell base station (MNB) 510 includes a receiving section 511, a control section 512, and a transmission section 513.

The receiving section 511 receives an uplink signal of the measurement result report from the wireless terminal 500.

The control section 512 determines a femtocell base station group of which the reference signal received power value from the femtocell base station is a predetermined value or more to be a destination of an interference control request, on the basis of the measurement result report from the wireless terminal 500. The above-mentioned predetermined value is set to a reference signal received power value from the macrocell base station 510 which is a serving cell of the wireless terminal 500. Meanwhile, in consideration of an offset added to an index at the time of handover from a macrocell to a femtocell, the above-mentioned predetermined value may be a value obtained by subtracting an offset value from the reference signal received power value from the macrocell base station 510.

The transmission section 513 transmits an interference control request to the femtocell base station group which is a destination of the interference control request determined by the control section 512. The interference control request chiefly includes an identifier of the wireless terminal 500, each identifier of the femtocell base station group of which the reference signal received power value is a predetermined value or more, and each reference signal received power value of the femtocell base station group.

As shown in FIG. 2, the femtocell base station (HNB) 520 includes a receiving section 521, an interference control section 522, and a transmission section 523. Another femtocell base station also has the same configuration.

The receiving section 521 receives the interference control request transmitted from the macrocell base station 510 through a core network. In addition, the receiving section 521 receives a downlink reference signal and notification information transmitted from the macrocell base station 510, and measures reference signal received power. Further, when communication with a wireless terminal connected to the local station is performed, the receiving section 521 receives an uplink wireless signal from the wireless terminal.

The interference control section 522 performs a downlink transmission power control of local station on the basis of the interference control request from the macrocell base station 510, the CSG UE list and an adjacent UE list. The adjacent UE list is a list of identifiers of wireless terminals which are capable of being connected to the femtocell base station (adjacent femtocell base station) adjacent to the local station (local station femtocell base station), but are not capable of being connected to the local station femtocell base station.

Figure 3:
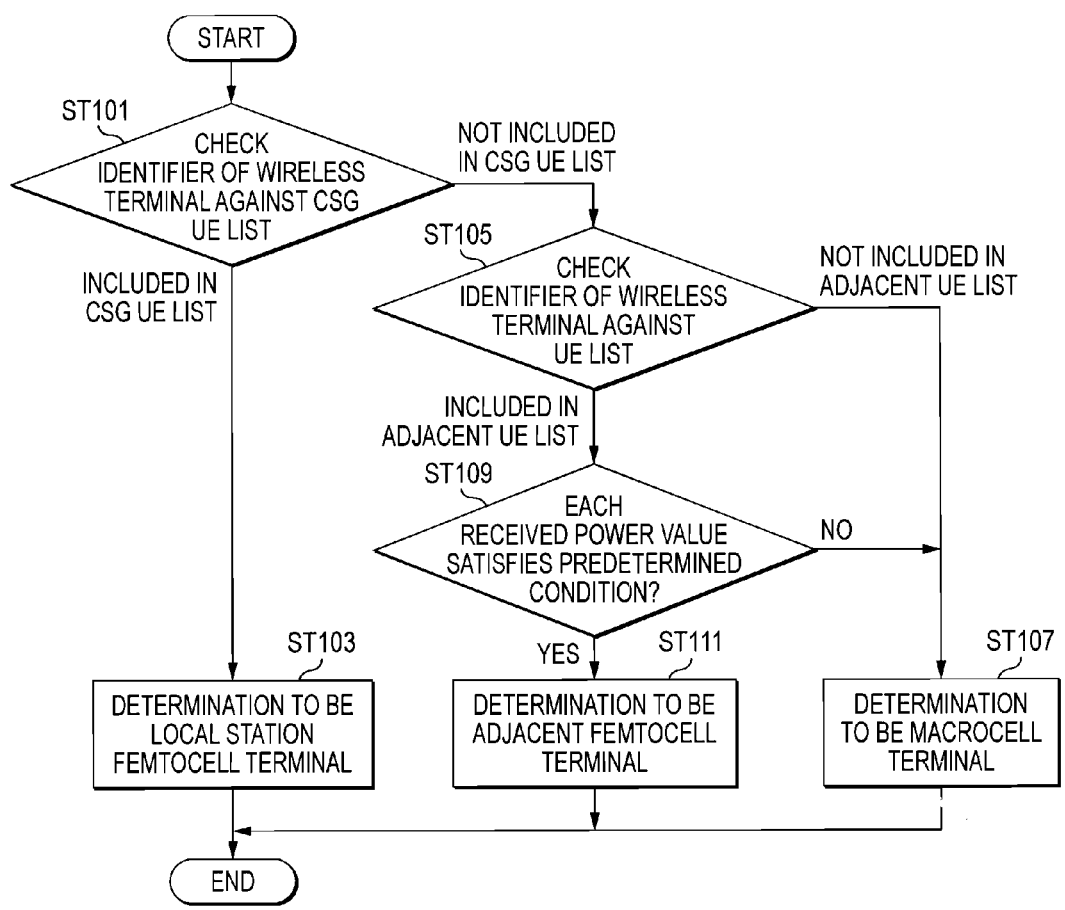
FIG. 3 is a flow diagram illustrating operations performed by an interference control section of the femtocell base station (HNB).

FIG. 3 is a flow diagram illustrating operations performed by the interference control section 522 of the femtocell base station (HNB). As shown in FIG. 3, the interference control section 522 checks an identifier of a wireless terminal included in the interference control request against the CSG UE list held by the local station, and determines whether the identifier of the wireless terminal is included in the CSG UE list (step ST101). When the identifier of the wireless terminal is included in the CSG UE list, the interference control section 522 determines the wireless terminal to be the femtocell base station femtocell terminal (step ST103), and the interference control section 522 does not perform an interference control. On the other hand, when the identifier of the wireless terminal is not included in the CSG UE list, the interference control section 522 checks the identifier of the wireless terminal against the adjacent UE list, and determines whether the identifier of the wireless terminal is included in the adjacent UE list (step ST105).

When the identifier of the wireless terminal is not included in the adjacent UE list, the interference control section 522 determines the wireless terminal to be a macrocell terminal (MUE) (step ST107). At this time, the interference control section 522 performs an interference control on the wireless terminal determined to be a macrocell terminal, by setting the downlink transmission power of the local station on the basis of the reference signal received power from the macrocell base station 510 measured by the receiving section 521 of the local station and the transmission power required for a coverage area to be formed by the local station.

On the other hand, when the identifier of the wireless terminal is included in the adjacent UE list, the interference control section 522 determines whether the received power value of each femtocell base station included in the interference control request satisfies predetermined conditions (step ST109). The term "predetermined conditions" mean that each reference signal received power value of the adjacent femtocell base station and the local station to which the wireless terminal is capable of being connected is included in the interference control request, that is, both the reference signal received power value transmitted from the adjacent femtocell base station to the wireless terminal and the reference signal received power value transmitted from the local station to the wireless terminal are a predetermined value or more, and the reference signal received power value of the local station is larger than that of the adjacent femtocell base station. When the predetermined conditions are satisfied, the interference control section 522 determines the wireless terminal to be an adjacent femtocell terminal (HUE) (step ST111). At this time, the interference control section 522 determines to temporarily reduce the transmission power of the local station up to a lower limit. On the other hand, when the predetermined conditions are not satisfied, that is, when the received power value of the adjacent femtocell base station is not included in the interference control request, or the reference signal received power value of the local station is smaller than that of the adjacent femtocell base station, the interference control section 522 determines the wireless terminal to be a macrocell terminal (MUE) (step ST107). At this time, the interference control section 522 performs an interference control on the wireless terminal determined to be a macrocell terminal.

The transmission section 523 periodically transmits the reference signal and the notification information in accordance with the transmission power value determined by the interference control section 522, and forms a coverage area of the local station femtocell base station.

Figure 4:
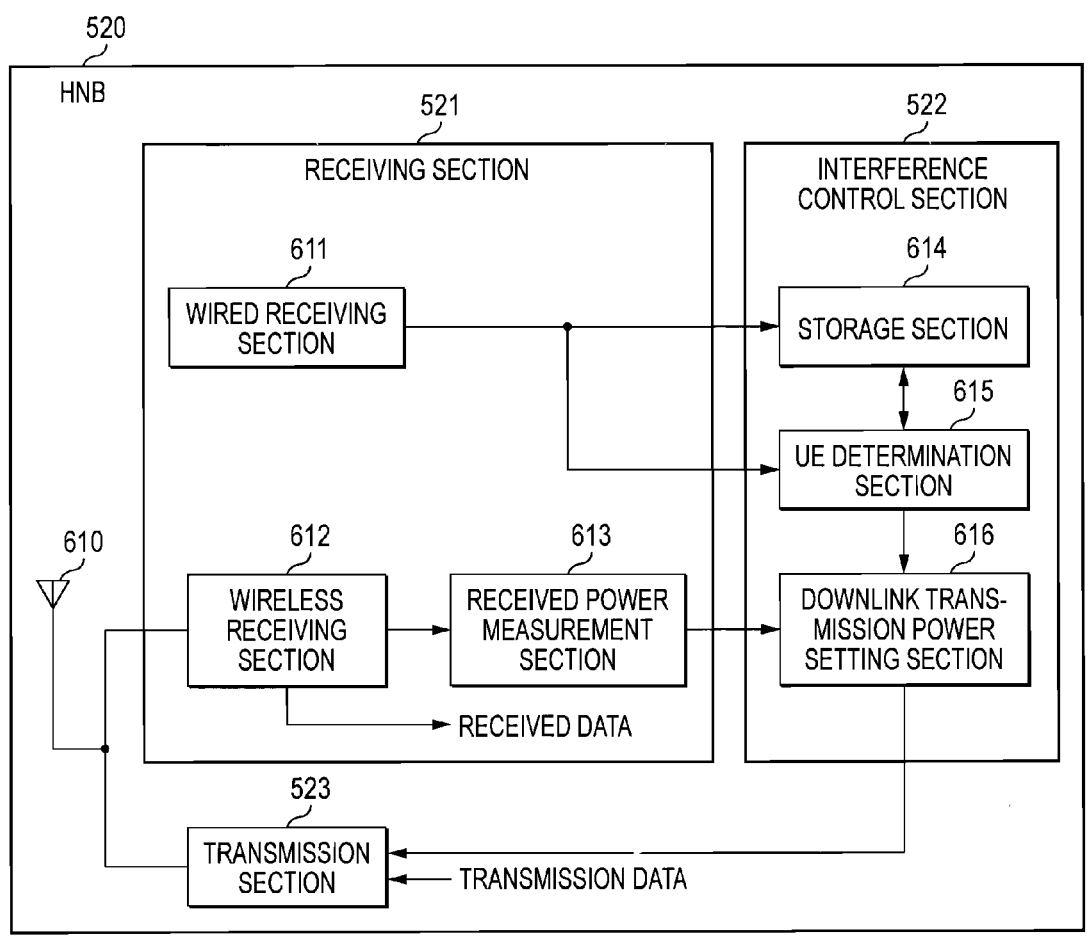
FIG. 4 is a block diagram illustrating a detailed configuration of the femtocell base station (HNB) according to the first embodiment.

FIG. 4 is a block diagram illustrating a detailed configuration of the femtocell base station (HNB) according to the first embodiment. As shown in FIG. 4, the femtocell base station (HNB) includes an antenna 610, the receiving section 521, the interference control section 522, and the transmission section 523. The receiving section 521 includes a wired receiving section 611, a wireless receiving section 612, and a received power measurement section 613. In addition, the interference control section 522 includes a storage section 614, a UE determination section 615, and a downlink transmission power setting section 616.

The wired receiving section 611 of the receiving section 521 is connected to the macrocell base station 510 in a wired manner through a core network, and receives an interference control request from the macrocell base station 510. In addition, the wired receiving section 611 is also connected to another femtocell base station in a wired manner. When the femtocell base station exchanges a wireless terminal list (adjacent UE list) capable of being connected to another femtocell base station, the wired receiving section 611 receives the adjacent UE list from the other femtocell base station. Meanwhile, the receiving section 521 may wirelessly receive the interference control request or the adjacent UE list. The wired receiving section 611 outputs the received adjacent UE list to the storage section 614 of the interference control section 522, and outputs the interference control request to the UE determination section 615 of the interference control section 522.

The wireless receiving section 612 of the receiving section 521 receives a downlink signal from the macrocell base station 510 through the antenna 610, and receives an uplink signal from the femtocell wireless terminal which is being connected to the local station. Meanwhile, the wireless receiving section 612 receiving a reference signal as the uplink signal from the macrocell base station 510 outputs the received signal to the received power measurement section 613. On the other hand, the wireless receiving section 612 receiving the uplink signal from the femtocell wireless terminal performs demodulation and decoding processes on the uplink signal as user's individual uplink data.

The reference signal from the macrocell base station 510 received by the wireless receiving section 612 is input to the received power measurement section 613 of the receiving section 521. The received power measurement section 613 measures reference signal received power, and outputs the measurement value thereof to the downlink transmission power setting section 616 of the interference control section 522.

The storage section 614 of the interference control section 522 holds the adjacent UE list which is input from the wired receiving section 611. Meanwhile, when an access restriction that limits the connection to the local station only to a specific user (CSG user) is performed, the storage section 614 also holds a list (CSG UE list) of identifiers of wireless terminals capable of being connected to the local station.

The UE determination section 615 of the interference control section 522 refers to a reference signal received power value of the local station included in the interference control request which is input from the wired receiving section 611. When the received power value is a predetermined value or more, the UE determination section 615 loads the CSG UE list and the adjacent UE list from the storage section 614, and checks an identifier of a wireless terminal included in the interference control request against the CSG UE list and the adjacent UE list. When the identifier of the wireless terminal is not only included in the CSG UE list but also in the adjacent UE list, the UE determination section 615 determines the wireless terminal to be a macrocell terminal (MUE), and outputs a determination result thereof to the downlink transmission power setting section 616. In addition, when the identifier of the wireless terminal is included in the adjacent UE list, the UE determination section 615 refers to a reference signal received power value from a peripheral femtocell included in the interference control request, determines the wireless terminal to be an adjacent femtocell terminal (HUE) when each reference signal received power value of the adjacent femtocell base station and the local station to which the wireless terminal is capable of being connected is included in the interference control request and the reference signal received power value of the local station is larger than that of the adjacent femtocell base station, and outputs a determination result thereof to the downlink transmission power setting section 616.

The measurement value of the reference signal received power from the macrocell base station 510 is input from the received power measurement section 613 of the receiving section 521 to the downlink transmission power setting section 616 of the interference control section 522, and the determination result of the wireless terminal included in the interference control request is input from the UE determination section 615 thereto. When the wireless terminal is a macrocell terminal (MUE), the downlink transmission power setting section 616 sets the downlink transmission power of the local station on the basis of the measurement value of the reference signal received power from the macrocell base station and the transmission power required for a coverage area to be formed by the local station. On the other hand, when the wireless terminal is an adjacent femtocell terminal (HUE), the downlink transmission power setting section 616 sets to temporarily reduce the downlink transmission power of the local station to a lower limit. Meanwhile, the period of time in which the downlink transmission power is reduced up to a lower limit is a period of time until the wireless terminal capable of being connected to the local station performs a communication request, or until the uplink signal received power becomes a reference value or less (until the adjacent femtocell terminal is out of service), or until the adjacent femtocell base station receives out-of-service information transmitted in a wired manner through a core network when the adjacent femtocell terminal is out of service.

The transmission section 523 periodically transmits a reference signal and a notification signal in accordance with the downlink transmission power value which is input from the downlink transmission power setting section 616.

Figure 5:
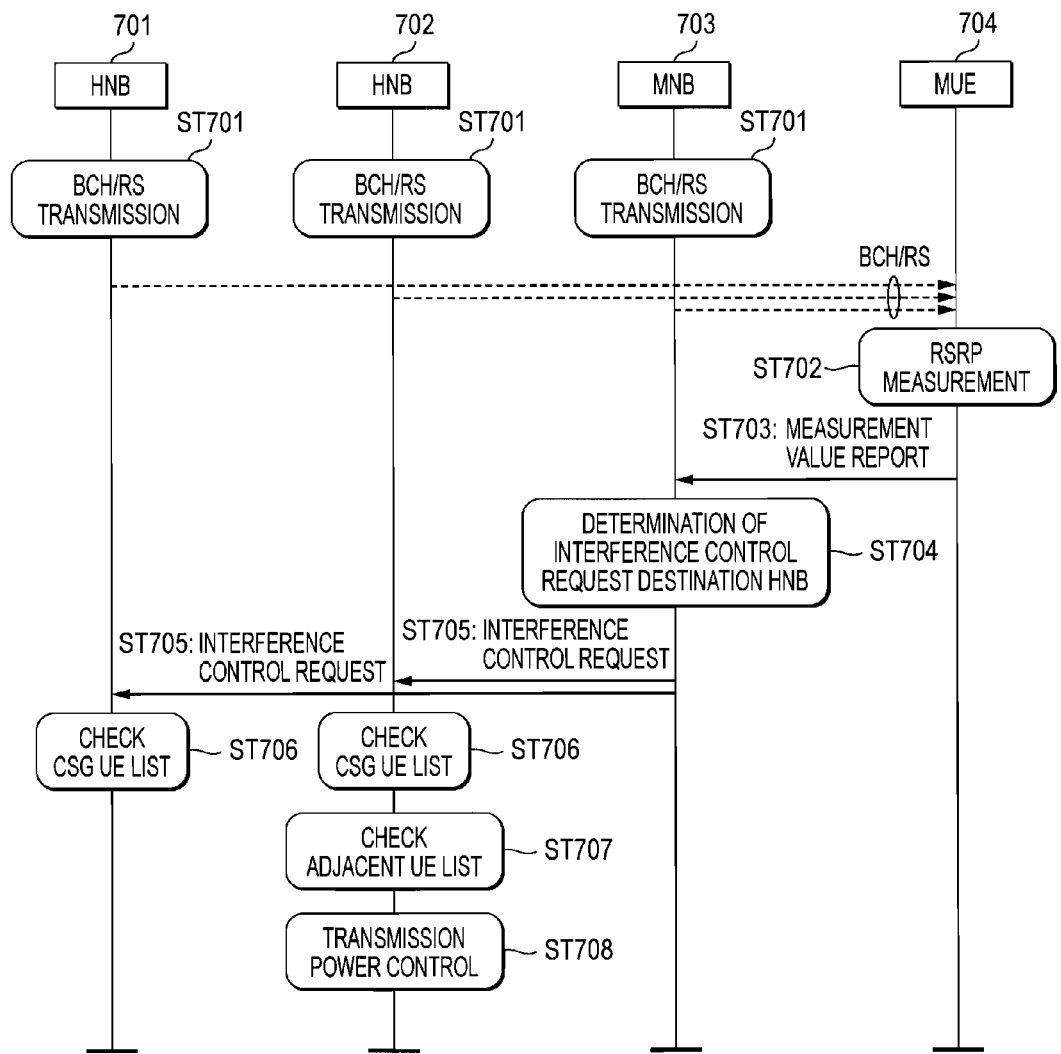
FIG. 5 is a sequence diagram illustrating an example of operations of the wireless communication system according to the first embodiment.

FIG. 5 is a sequence diagram illustrating an example of operations of the wireless communication system according to the first embodiment. In the example shown in FIG. 5, a wireless terminal (MUE) 704 is being connected to a macrocell base station (MNB) 703, and is capable of being connected to a femtocell base station (HNB) 701, but is not capable of being connected to a femtocell base station (HNB) 702.

In step ST701, each of the base stations, that is, the femtocell base station (HNB) 701, the femtocell base station (HNB) 702 and the macrocell base station (MNB) 703 periodically transmits the notification information and the reference signal (BCH/RS) to coverage areas thereof.

In step ST702, the wireless terminal (MUE) 704 receives BCH/RS from each base station, and measures the received power (RSRP) of each reference signal (RS). Meanwhile, the wireless terminal (MUE) 704 receives BCH/RS from base stations detected by performing a neighboring cell search. Meanwhile, the neighboring cell search is generally performed on the basis of received power of a first synchronization channel P-SCH (Primary SCH).

In step ST703, in a case where a predetermined reference is satisfied, such as a case where RSRP from the macrocell base station (MNB) 703 which is a serving cell becomes a predetermined value or less, or a case where RSRP of another base station becomes a predetermined value or more, the wireless terminal 704 reports RSRP measured in step ST702 to the macrocell base station (MNB) 703.

In step ST704, the macrocell base station (MNB) 703 determines a femtocell base station transmitting the interference control request on the basis of the report from the wireless terminal (MUE) 704. Meanwhile, a femtocell base station of which RSRP is a predetermined value or more is determined as a transmission destination of the interference control request. In the example shown in FIG. 5, RSRP of both the femtocell base station (HNB) 701 and the femtocell base station (HNB) 702 is a predetermined value or more.

In step ST705, the macrocell base station (MNB) 703 transmits the interference control request to the femtocell base station determined in step ST704. Meanwhile, the interference control request includes an identifier of the wireless terminal (MUE) 704, an identifier of the femtocell base station of which RSRP is a predetermined value or more, and RSRP of the femtocell base station.

In step ST706, the femtocell base stations (HNB) 701 and 702 check the identifier of the wireless terminal (MUE) 704 included in the interference control request against the CSG UE list held by the local station. Meanwhile, the CSG UE list is a list of identifiers of wireless terminals capable of being connected to the local station. The femtocell base station (HNB) 701 which includes the identifier of the wireless terminal (MUE) 704 in the CSG UE list does not perform an interference control. On the other hand, the femtocell base station (HNB) 702 which does not include the identifier of the wireless terminal (MUE) 704 in the CSG UE list checks the identifier of the wireless terminal (MUE) 704 against the adjacent UE list held by the local station (step ST707).

In step ST708, when the identifier of the wireless terminal (MUE) 704 is included in the adjacent UE list, and RSRP of the femtocell base station (HNB) 702 is larger than the RSRP of the femtocell base station (HNB) 701, the femtocell base station (HNB) 702 sets to temporarily reduce the downlink transmission power of the local station up to a lower limit. On the other hand, when the identifier of the wireless terminal (MUE) 704 is not included in the adjacent UE list, similarly to a normal macrocell connection terminal, the femtocell base station (HNB) 702 sets the downlink transmission power of the local station on the basis of the measurement value of the reference signal received power from the macrocell base station and the transmission power required for a coverage area to be formed by the local station.

Figure 6:
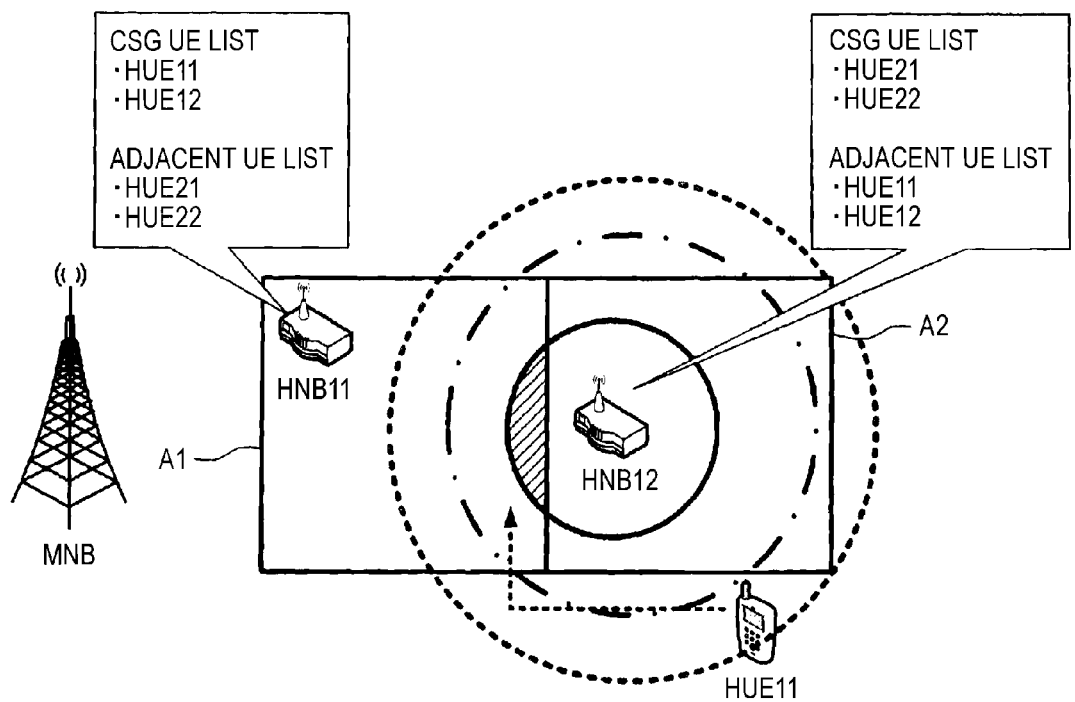
FIG. 6 is a diagram illustrating an example of a coverage hole formed when one femtocell base station performs a downlink transmission power reduction control of the first embodiment, in a situation in which two femtocell base stations are installed at a distance where each femtocell overlaps each other.
Figure 17:
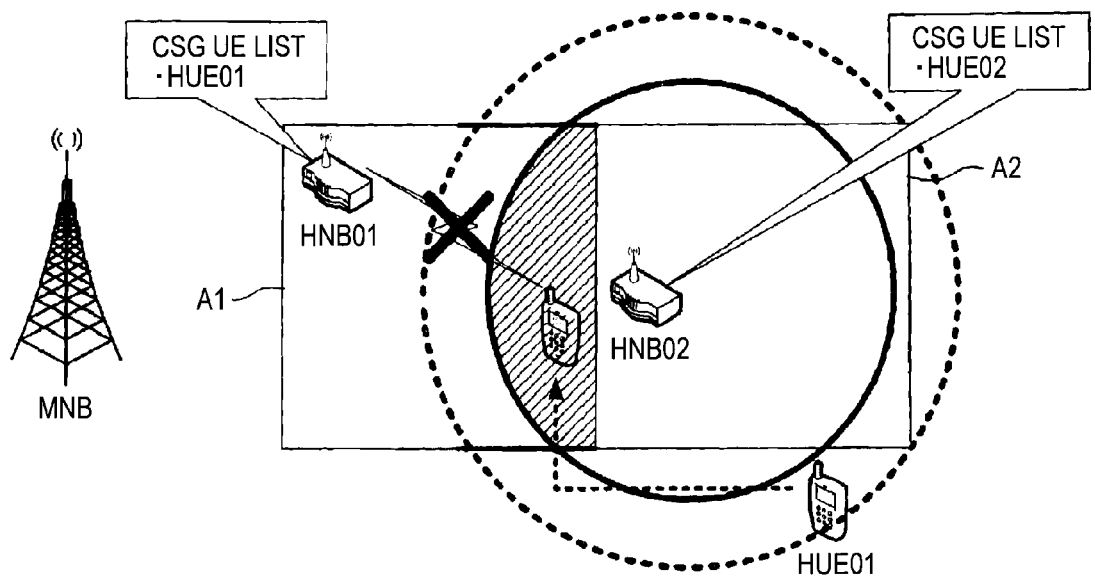
FIG. 17 is a diagram illustrating an example of a coverage hole formed when one femtocell base station performs a downlink transmission power reduction control based on a macrocell reference, in a situation in which two femtocell base stations are installed at a distance where each femtocell overlaps each other.
Figure 18:
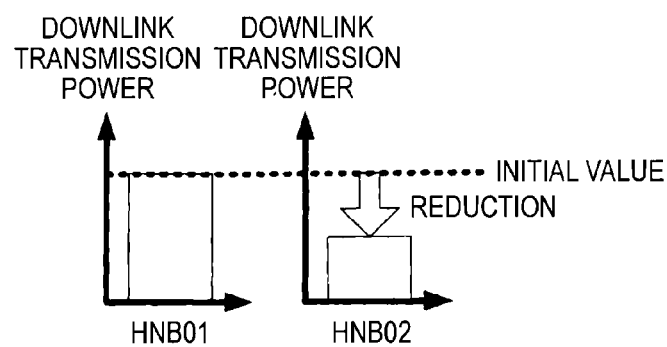
FIG. 18 is a comparison diagram of downlink transmission power of each femtocell base station in the situation shown in FIG. 17.

FIG. 6 is a diagram illustrating an example of a coverage hole formed when one femtocell base station performs a downlink transmission power reduction control of the first embodiment, in a situation in which two femtocell base stations are installed at a distance where each femtocell overlaps each other. Meanwhile, each femtocell base station is installed in an area of an adjacent room, house or the like, similarly to FIG. 17. In the example shown in FIG. 6, a femtocell base station (hereinafter, referred to as a "local station femtocell base station") HNB 12 is installed in an area (hereinafter referred to as a "local area") A2, and a femtocell base station (hereinafter, referred to as an "adjacent femtocell base station") HNB 11 is installed in an area (hereinafter referred to as an "adjacent area") A1 adjacent to the local area A2.

In addition, the local station femtocell base station HNB 12 stores the CSG UE list including identifiers of wireless terminals HUE21 and HUE22 which are capable of being connected to the local station, and the adjacent UE list including identifiers of wireless terminals HUE11 and HUE12 which are capable of being connected to the adjacent femtocell base station HNB 11 but are not capable of being connected to the local station femtocell base station HNB 12. Similarly, the adjacent femtocell base station HNB 11 stores the CSG UE list including identifiers of the wireless terminals HUE11 and HUE12 which are capable of being connected to the local station, and the adjacent UE list including identifiers of the wireless terminals HUE21 and HUE22 which are capable of being connected to the local station femtocell base station HNB 12 but are not capable of being connected to the adjacent femtocell base station HNB 11.

According to the present embodiment, when the wireless terminal HUE11 which is being connected to a macrocell base station MNB comes close to the adjacent area A1 from the local area A2 side, the wireless terminal HUE11 transmits a measurement result of each reference signal received power from the femtocell base stations HNB 11 and HNB 12 to the macrocell base station MNB. Meanwhile, in the example shown in FIG. 6, all of each of the reference signal received power from the femtocell base stations HNB 11 and HNB 12 measured by the wireless terminal HUE11 are a predetermined value or more, and the reference signal received power value of the local station femtocell base station HNB 12 is larger than that of the adjacent femtocell base station HNB 11. The macrocell base station MNB transmits the interference control request, including the identifier of the wireless terminal HUE11 and each identifier and each reference signal received power value of the femtocell base stations HNB 11 and HNB 12, to the femtocell base stations HNB 11 and HNB 12.

Figure 7:
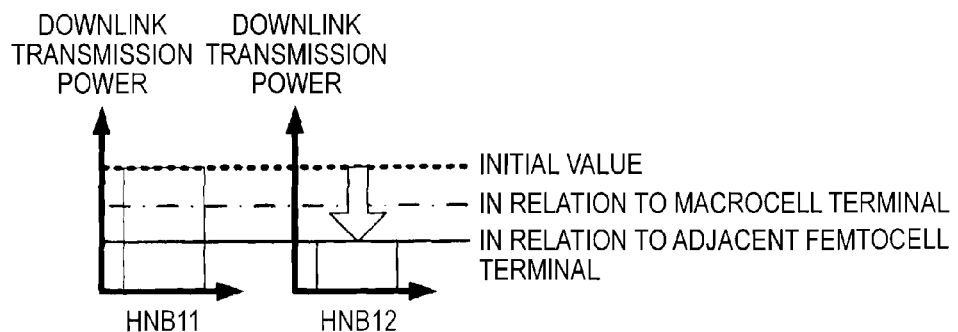
FIG. 7 is a comparison diagram of downlink transmission power of each femtocell base station in the situation shown in FIG. 6.

The identifier of the wireless terminal HUE11 included in the interference control request from the macrocell base station MNB is included in the adjacent UE list held by the local station femtocell base station HNB 12. In addition, each reference signal received power value of the femtocell base stations HNB 11 and HNB 12 is included in the interference control request from the macrocell base station MNB, and the reference signal received power value of the local station femtocell base station HNB 12 is larger than that of the adjacent femtocell base station HNB 11. At this time, the local station femtocell base station HNB 12 determines the wireless terminal HUE11 indicated by the interference control request to be an adjacent femtocell terminal, and temporarily reduces transmission power of the local station up to a lower limit, as shown in FIG. 7. As a result, the coverage of the local station femtocell base station HNB 12 changes from the dotted-line circle shown in FIG. 6 to the solid-line circle. Meanwhile, the dashed-line circle shown in FIG. 6 is a coverage of the local station femtocell base station HNB 12 based on transmission power which is set when the wireless terminal determined to be a macrocell terminal by the local station femtocell base station HNB 12 comes close to the adjacent area A1 from the local area A2 side.

As described above, according to the first embodiment, when the wireless terminal determined to be an adjacent femtocell terminal by the local station femtocell base station comes close to an adjacent femtocell base station from the location side of the local station femtocell base station, the local station femtocell base station drastically reduces the downlink transmission power. At this time, since the coverage hole capable of being formed in the adjacent femtocell by the downlink wireless signal of the local station femtocell base station is reduced, connectivity to the adjacent femtocell base station by the adjacent femtocell terminal can be improved. In addition, since the drastic reduction of the downlink transmission power by the local station femtocell base station is temporary, it is possible to minimize the influence on the local station femtocell terminal due to a reduction in coverage of the local station femtocell.

In the present embodiment, the identifier of the wireless terminal registered in the adjacent UE list held by the femtocell base station is exchanged through an X2 interface in a wired manner with another femtocell base station. As another method, the femtocell base station may create the adjacent UE list in which the wireless terminals detected a predetermined number of times or more during a predetermined period are registered except for the wireless terminal registered in the CSG UE list.

Second Embodiment

In the first embodiment, the local station femtocell base station reduces the transmission power of the local station when it is determined to be an adjacent femtocell terminal up to a lower limit. However, when the local station femtocell base station reduces the transmission power of the local station up to a lower limit during the connection to the local station femtocell terminal to thereby narrow the coverage, there may be a case where the connection between the local station femtocell terminal and the local station femtocell base station is cut off.

In a wireless communication system of a second embodiment, when the local station femtocell base station reduces the transmission power during the connection to the local station femtocell terminal in addition to the downlink transmission power reduction control method described in the first embodiment, the amount of reduction is controlled in accordance with a communication state of the local station femtocell terminal. In this manner, the amount of reduction in the transmission power is made variable, thereby allowing connectivity to the adjacent femtocell base station by the adjacent femtocell terminal to be improved while maintaining the connection between the local station femtocell base station and the local station femtocell terminal.

Figure 8:
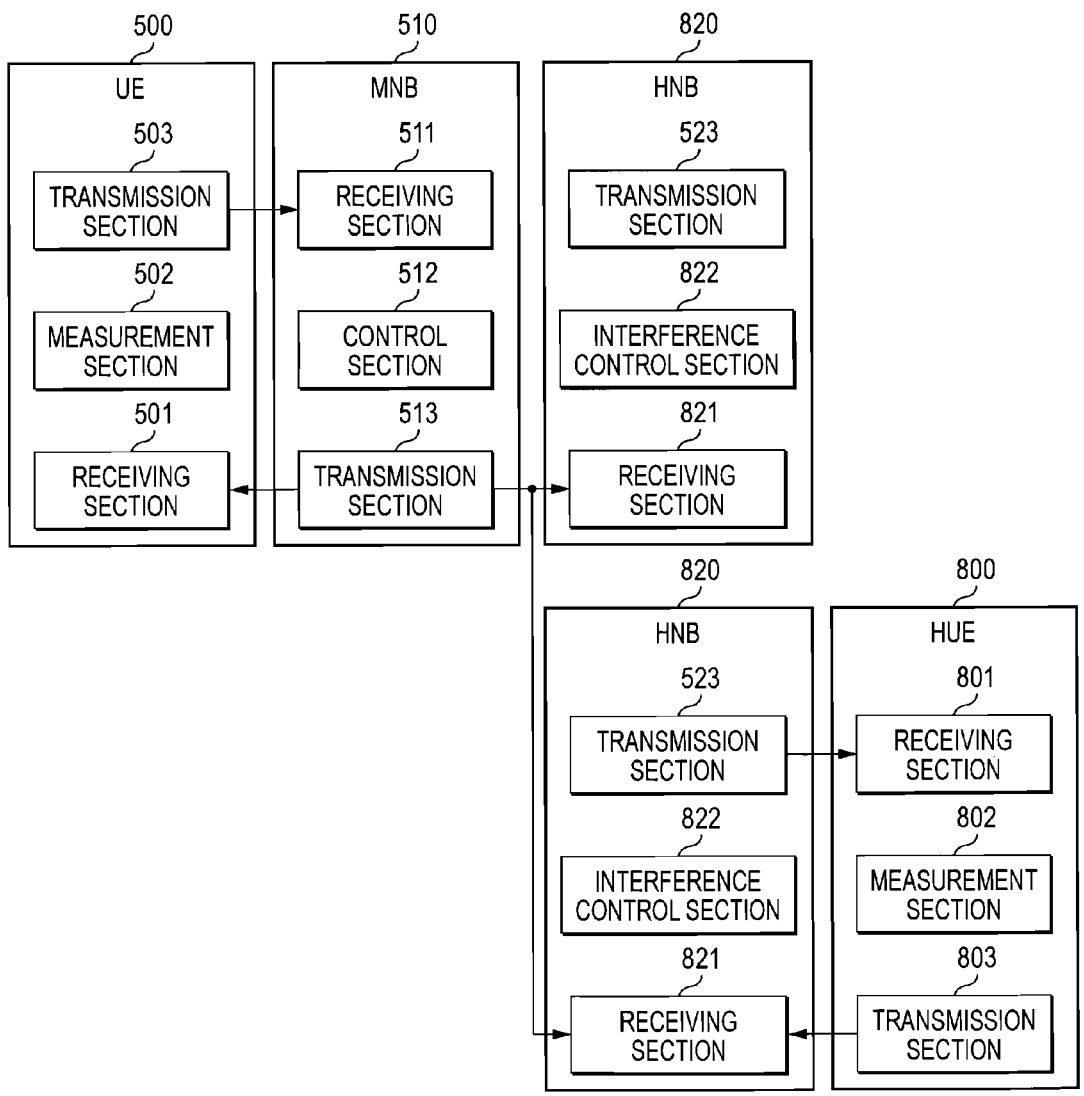
FIG. 8 is a block diagram illustrating each configuration of a wireless terminal, a macrocell base station and femtocell base stations which are included in a wireless communication system according to a second embodiment.

FIG. 8 is a block diagram illustrating each configuration of a wireless terminal, a macrocell base station and femtocell base stations included in the wireless communication system according to the second embodiment. In FIG. 8, the same or equivalent parts as or to the components included in the wireless communication system of the first embodiment are designated by the same reference signs or equivalent reference signs, and the description thereof will be simplified or omitted. The wireless communication system of the second embodiment shown in FIG. 8 includes a wireless terminal (UE) 500, a macrocell base station (MNB) 510, a plurality of femtocell base stations (HNB) 820, and a femtocell wireless terminal (HUE) 800. The femtocell wireless terminal (HUE) 800 is being connected to one of a plurality of femtocell base stations (HNB) 820, and includes a receiving section 801, a measurement section 802, and a transmission section 803.

The receiving section 801 receives a downlink signal from the femtocell base station which is a serving cell.

The measurement section 802 measures reference signal received power (RSRP or RSCP) or reception quality (CQI: Channel Quality Indicator) included in the downlink signal transmitted from the femtocell base station which is a serving cell. Meanwhile, the measurement section 802 also performs a measurement of reference signal received power of a neighboring cell for handover at any time, in accordance with instructions from the femtocell base station.

The transmission section 803 reports the reference signal received power (RSRP or RSCP) or the reception quality (CQI), measured by the measurement section 802, to the femtocell base station which is a serving cell.

The femtocell base station (HNB) 820 has the following function in addition to the function of the femtocell base station (HNB) 520 described in the first embodiment. That is, the receiving section 821 of the femtocell base station (HNB) 820 receives the reference signal received power (RSRP or RSCP) or the reception quality (CQI) reported from the femtocell wireless terminal (HUE) 800.

The reference signal received power (RSRP or RSCP) or the reception quality (CQI) received by the receiving section 821 is input to an interference control section 822 of the femtocell base station (HNB) 820. When an adjacent femtocell terminal is detected, the interference control section 822 sets minimum transmission power capable of maintaining the connection to the connected femtocell wireless terminal (HUE) 800 on the basis of the reference signal received power (RSRP or RSCP) or the reception quality (CQI). Meanwhile, the interference control section 822 may set transmission power obtained by adding an offset to the minimum transmission power capable of maintaining the connection to the femtocell wireless terminal (HUE) 800.

Figure 9:
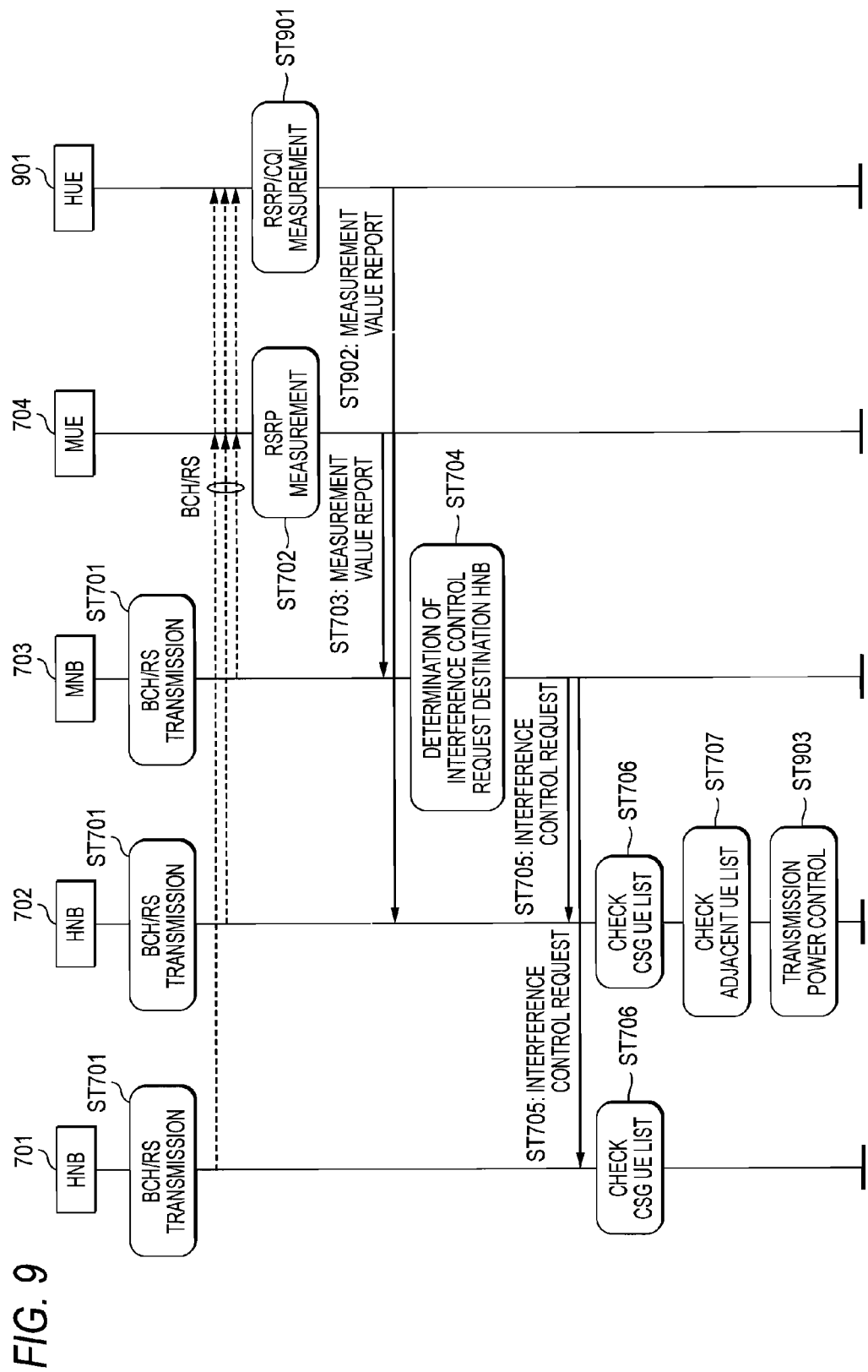
FIG. 9 is a sequence diagram illustrating an example of operations of the wireless communication system according to the second embodiment.

FIG. 9 is a sequence diagram illustrating an example of operations of the wireless communication system according to the second embodiment. In FIG. 9, the same or equivalent parts as or to the steps described in the sequence diagram of the first embodiment shown in FIG. 5 are designated by the same reference signs or equivalent reference signs, and the description thereof will be simplified or omitted. In the example shown in FIG. 9, a femtocell wireless terminal (HUE) 901 is being connected to the femtocell base station (HNB) 702. The sequence shown in FIG. 9 includes step ST901 to step ST903 in addition to step ST701 to ST707 of the sequence shown in FIG. 5.

In step ST901, the femtocell wireless terminal (HUE) 901 measures the reference signal received power (RSRP or RSCP) or the reception quality (CQI) from the femtocell base station (HNB) 702 which is a serving cell. In addition, the femtocell wireless terminal (HUE) 901 receives a BCH signal, and receives control information on a report such as a reporting period of a measurement result.

In step ST902, the femtocell wireless terminal (HUE) 901 reports the reference signal received power (RSRP or RSCP) or the reception quality (CQI) to the femtocell base station (HNB) 702 which is a serving cell, on the basis of the control information on the report.

After step ST707, the femtocell base station (HNB) 702 reduces transmission power of the local station within a range in which the reference signal received power (RSRP or RSCP) or the reception quality (CQI) received in step ST902 becomes a predetermined value or more.

As described above, according to the second embodiment, the downlink transmission power of the femtocell base station is reduced in a range in which the connection to the femtocell terminal is maintained, on the basis of the measurement result of the connected femtocell terminal. For this reason, it is possible to improve connectivity to the adjacent femtocell base station by the adjacent femtocell terminal while maintaining the connection between the femtocell base station and the femtocell terminal.

Third Embodiment

In the first embodiment, when the identifier of the wireless terminal included in the interference control request from the macrocell base station is included in the adjacent UE list of the local station, each reference signal received power value of the adjacent femtocell base station and the local station is included in the interference control request, and the reference signal received power value of the local station is larger than that of the adjacent femtocell base station, the local station femtocell base station determines the wireless terminal to be an adjacent femtocell terminal (HUE). For this reason, when the above-mentioned conditions are satisfied even in the case where the wireless terminal comes close to the adjacent femtocell base station from the location side of the local station femtocell base station and the case where it moves away from the adjacent femtocell base station through the local station femtocell base station side, the local station femtocell base station determines the wireless terminal to be an adjacent femtocell terminal (HUE). However, when the adjacent femtocell terminal goes away from the adjacent femtocell base station, though the above-mentioned conditions are satisfied, it is not necessary that connectivity to the adjacent femtocell base station by the adjacent femtocell terminal is high.

In a wireless communication system according to a third embodiment, in addition to the downlink transmission power reduction control method described in the first embodiment, the local station femtocell base station drastically reduces the downlink transmission power only when the reference signal received power of the adjacent femtocell base station included in the interference control request sent from the macrocell base station increases. Reversely, even when the conditions described in the first embodiment are satisfied, the local station femtocell base station does not reduce the downlink transmission power when the reference signal received power of the adjacent femtocell base station is reduced.

High connectivity to the adjacent femtocell base station by the adjacent femtocell terminal is required when the adjacent femtocell terminal comes close to the adjacent femtocell base station from the location side of the local station femtocell base station. Therefore, as in the present embodiment, it is possible to prevent performance degradation of the local station femtocell base station when high connectivity is not required, by drastically reducing the downlink transmission power only in a case where the adjacent femtocell terminal comes close to the adjacent femtocell base station from the location side of the local station femtocell base station.

Fourth Embodiment

In a fourth embodiment, the wireless terminal has an adjacent HNB list. The adjacent HNB list is a list of identifiers of femtocell base stations adjacent to a femtocell base station to which the wireless terminal having the adjacent HNB list is capable of being connected. The wireless terminal of the present embodiment sends RSRP of each base station to the macrocell base station only in a case where RSRP of both the connectable femtocell base station and the femtocell base station included in the adjacent HNB list is a predetermined value or more and RSRP of the femtocell base station included in the adjacent HNB list is larger than that of the connectable femtocell base station. The macrocell base station cannot determine a femtocell base station transmitting the interference control request without a report regarding RSRP from the wireless terminal.

In this manner, only when RSRP from the femtocell base station satisfies a predetermined reference, the wireless terminal performs a report regarding RSRP to the macrocell base station. For this reason, it is possible to reduce the amount of signaling from the wireless terminal to the femtocell base station. Meanwhile, the adjacent HNB list is autonomously created by the wireless terminal. That is, the wireless terminal creates the adjacent HNB list from the identifier of the femtocell base station recognized as a peripheral femtocell base station during the connection to the connectable femtocell base station. Alternatively, notice of the adjacent HNB list may be given by a notification signal from a serving cell.

Fifth Embodiment

In a fifth embodiment, the wireless terminal which is being connected to the macrocell base station directly transmits the interference control request to the femtocell base station using an uplink wireless line without passing through the macrocell base station. In addition, as a transmission destination of the interference control request, the wireless terminal of the present embodiment is limited only to the femtocell base station located in the vicinity of the femtocell base station to which the wireless terminal is capable of being connected. In addition, when the interference control request is received from the wireless terminal, the femtocell base station of the present embodiment determines downlink transmission power on the basis of the interference control request.

As in the present embodiment, the interference control request is transmitted using an uplink wireless line from the wireless terminal to the femtocell base station, and thus it is not necessary to transmit the interference control request in a wired manner from the macrocell base station through a core network to the femtocell base station as in the above-mentioned embodiment. In addition, since the wireless terminal limits the transmission destination of the interference control request and uses the uplink wireless line only at the time of need, it is possible to improve connectivity to the adjacent femtocell base station of the wireless terminal capable of being connected to the femtocell base station adjacent to the femtocell base station to which the interference control request is transmitted, while suppressing the used amount of the uplink wireless line.

Figure 10:
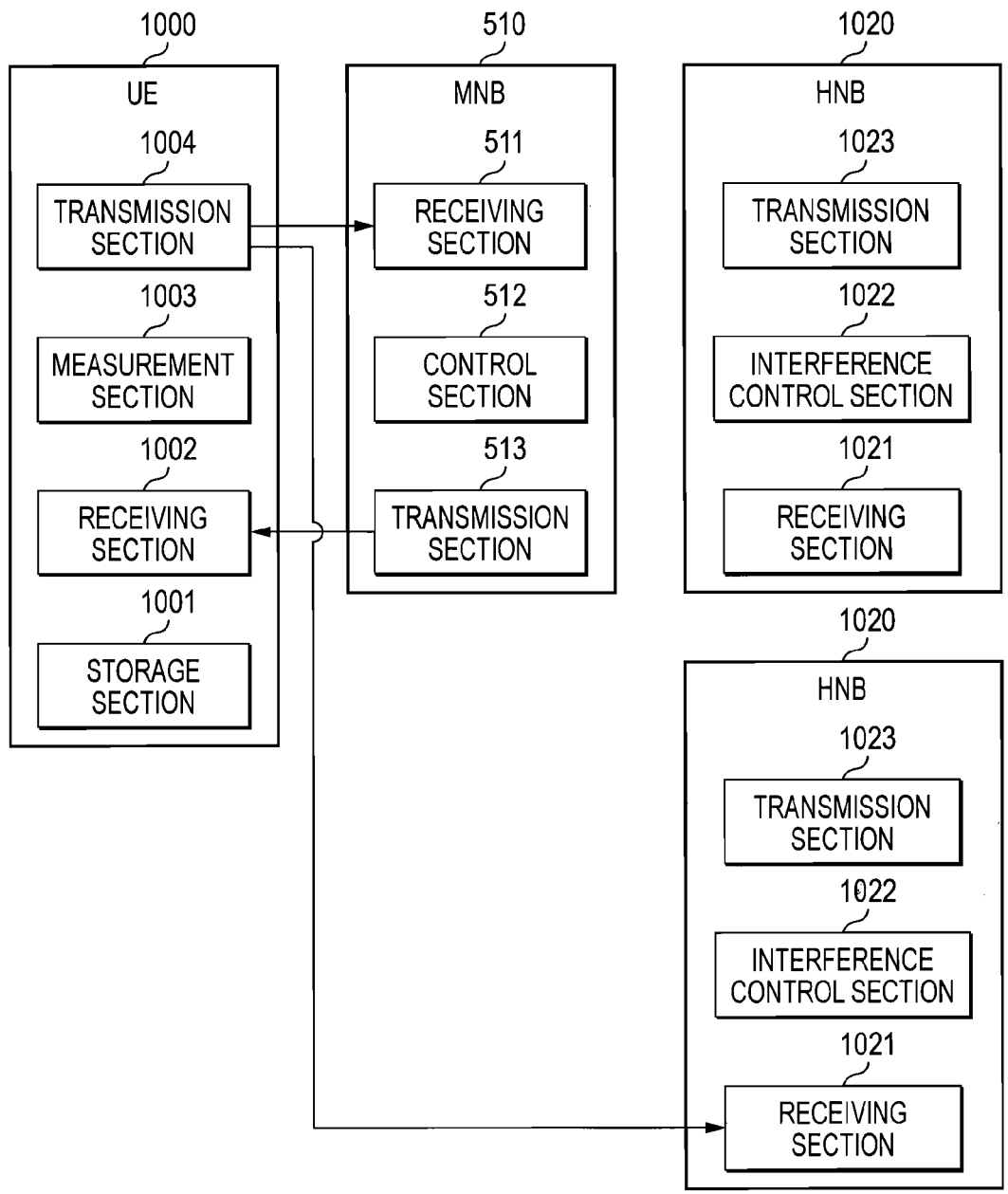
FIG. 10 is a block diagram illustrating each configuration of a wireless terminal, a macrocell base station and femtocell base stations which are included in a wireless communication system according to a fifth embodiment.

FIG. 10 is a block diagram illustrating each configuration of a wireless terminal, a macrocell base station and femtocell base stations which are included in a wireless communication system according to the fifth embodiment. In FIG. 10, the same or equivalent parts as or to the components included in the wireless communication system of the first embodiment are designated by the same reference signs or equivalent reference signs, and the description thereof will be simplified or omitted. The wireless communication system of the fifth embodiment shown in FIG. 10 includes a wireless terminal (UE) 1000 which is being connected to a macrocell base station 510, the macrocell base station (MNB) 510, and a plurality of femtocell base stations (HNB) 1020. The wireless terminal (UE) 1000 is capable of being connected to one specific femtocell base station of a plurality of femtocell base stations (HNB) 1020, but is not capable of being connected to another femtocell base station.

The wireless terminal 1000 includes a storage section 1001, a receiving section 1002, a measurement section 1003, and a transmission section 1004.

The storage section 1001 stores a peripheral femtocell list including an identifier of the femtocell base station detected at the time of a neighboring cell search performed during the connection to the connectable femtocell base station. The identifier of the femtocell base station is generally included in a notification signal (BCH), and is downlink-transmitted to the entire coverage area of a femtocell formed by the femtocell base station. Meanwhile, the identifier of the femtocell base station may be an identifier of a neighboring femtocell base station included in a peripheral femtocell list when it is transmitted from the femtocell base station as the peripheral femtocell list during the connection to the femtocell base station to which the wireless terminal 1000 is capable of being connected.

The receiving section 1002 receives a downlink signal from the macrocell base station 510 which is a serving cell. In addition, the receiving section 1002 receives a downlink reference signal from the macrocell base station 510, a femtocell base station group 1020 which is a neighboring cell, or a peripheral macrocell base station which is not shown. In addition, the receiving section 1002 receives and decodes notification information BCH from each cell.

The measurement section 1003, to which a received signal of a downlink reference signal from each cell is input from the receiving section 1002, measures each reference signal received power.

The transmission section 1004 refers to a decoding result of notification information of the femtocell base station having maximum downlink reference signal received power from each cell, and checks an identifier of the femtocell base station against a peripheral femtocell list of the storage section 1001. When the identifier of the femtocell base station is included in the peripheral femtocell list, the transmission section 1004 transmits an interference control request through an uplink transmission to the femtocell base station using a random access (RACH), on the basis of an uplink transmission parameter included in the decoded notification information. However, when the identifier of the femtocell base station is not included in the peripheral femtocell list, the transmission section 1004 does not transmit the interference control request. Meanwhile, the interference control request includes at least an identifier of the wireless terminal 1000. In addition, the interference control request may include each reference signal received power RSRP of the femtocell base station which is an interference source and the femtocell base station which desired to be connected to.

The femtocell base station (HNB) 1020 includes a receiving section 1021, an interference control section 1022, and a transmission section 1023.

The receiving section 1021 receives an uplink RACH transmission from the wireless terminal 1000, and decodes the interference control request to thereby output the request to the interference control section 1022.

The interference control section 1022 confirms whether the identifier of the wireless terminal included in the received interference control request is included in the adjacent UE list held by the local station, and reduces downlink transmission power of the local station when the identifier of the wireless terminal is included in the adjacent UE list. Meanwhile, the interference control section 1022 sets the amount of reduction in transmission power to a lower limit capable of being set by the local station. In addition, the interference control section 1022 may reduce the transmission power so that RSRP of the femtocell base station desired to be connected becomes larger than RSRP of the local station, on the basis of RSRP included in the interference control request. When the identifier of the wireless terminal included in the interference control request is not included in the adjacent UE list, the wireless terminal is not regarded as an adjacent femto user, and a power reduction at the time of a normal macrocell terminal access is performed. That is, the interference control section 1022 reduces reference signal received power from the macrocell base station and transmission power required for a coverage area formed by the local station. Meanwhile, when the interference control request of a predetermined number of times or more from the wireless terminal which is not included in the adjacent UE list is received, the interference control section 1022 regards the wireless terminal as a wireless terminal newly registered in the adjacent femtocell base station, and updates the adjacent UE list held by the local station.

The transmission section 1023 periodically transmits a reference signal and a notification signal in accordance with the transmission power value which is input from the interference control section 1022.

Figure 11:
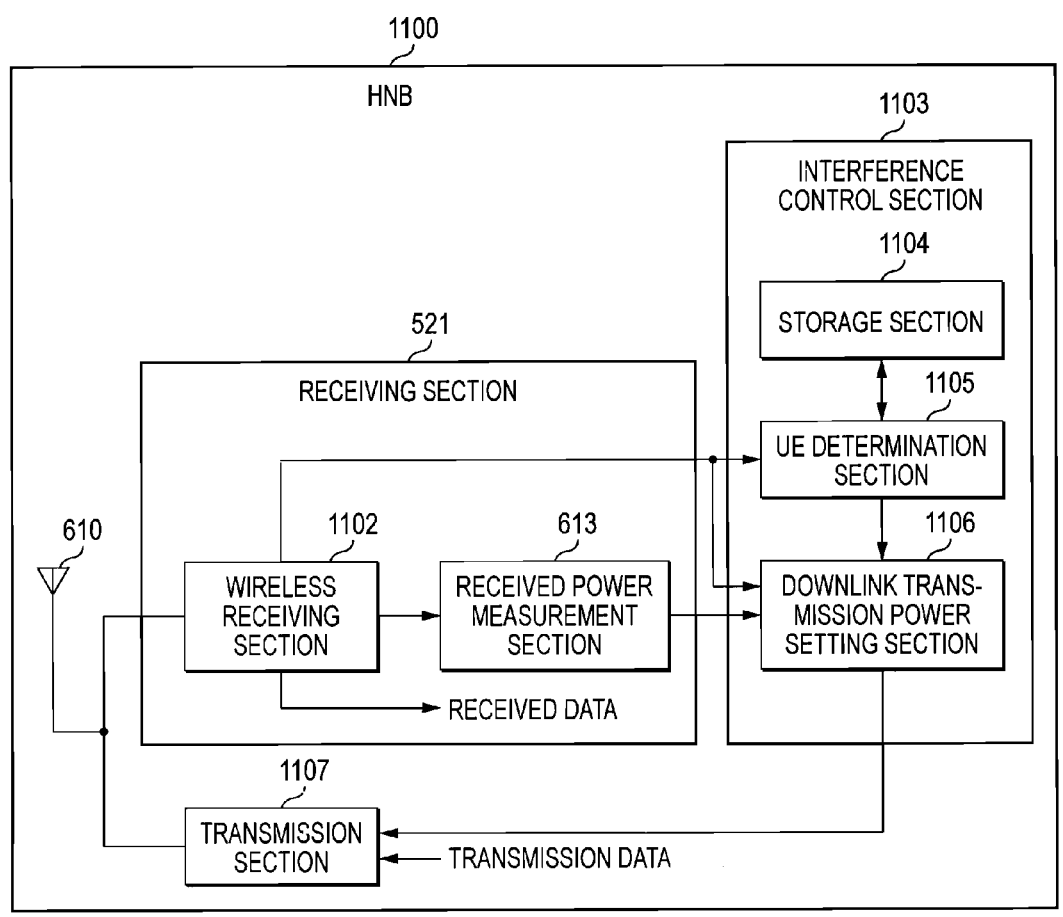
FIG. 11 is a block diagram illustrating a detailed configuration of the femtocell base station (HNB) according to the fifth embodiment.

FIG. 11 is a block diagram illustrating a detailed configuration of the femtocell base station (HNB) according to the fifth embodiment. In FIG. 11, the same or equivalent parts as or to the components of the femtocell base station according to the first embodiment are designated by the same reference signs or equivalent reference signs, and the description thereof will be simplified or omitted. The femtocell base station shown in FIG. 11 includes a receiving section 1101, an interference control section 1103, and a transmission section 1107. The receiving section 1101 includes a wireless receiving section 1102 and a received power measurement section 613. In addition, the interference control section 1103 includes a storage section 1104, a UE determination section 1105, and a downlink transmission power setting section 1106.

When the interference control request is included in a random access channel of the uplink wireless line, the wireless receiving section 1102 of the receiving section 1101 outputs the identifier of the wireless terminal included in the decoded interference control request to the UE determination section 1105. In addition, when RSRP of the local station and RSRP (desired adjacent RSRP) of the adjacent femtocell base station to which the wireless terminal desires to be connected is included in the interference control request, the wireless receiving section 1102 outputs these RSPP to the downlink transmission power setting section 1106.

The storage section 1104 of the interference control section 1103 stores the adjacent UE list indicating the identifier of the wireless terminal capable of being connected to the adjacent femtocell. Meanwhile, when an identifier of a wireless terminal is newly input from the UE determination section 1105, the identifier is added to the adjacent UE list. Meanwhile, an identifier of a wireless terminal which is not accessed for a certain period of time or more may be deleted from the adjacent UE list.

The interference control request is input to the UE determination section 1105 of the interference control section 1103 from the wireless receiving section 1102. In addition, the UE determination section 1105 loads the adjacent UE list from the storage section 1104, and confirms whether the identifier of the wireless terminal included in the interference control request is included in the adjacent UE list. The UE determination section 1105 determines the wireless terminal to be an adjacent femtocell terminal when the identifier of the wireless terminal is included in the adjacent UE list, and determines the wireless terminal to be a macrocell terminal when it is not included in the adjacent UE list. The UE determination section 1105 outputs the determination result to the downlink transmission power setting section 1106. Meanwhile, when the same identifier is input a certain number of times or more in a certain period of time, though not included in the adjacent UE list, the UE determination section 1105 regards the wireless terminal as a wireless terminal newly registered in the adjacent femtocell base station, the identifier of the wireless terminal is added to the adjacent UE list of the storage section 1104.

Similarly to the first embodiment, the downlink transmission power setting section 1106 of the interference control section 1103 sets the downlink transmission power in accordance with the determination result which is input from the UE determination section 1105. That is, when the wireless terminal is determined to be an adjacent femtocell terminal by the UE determination section 1105, the setting section sets to temporarily reduce the downlink transmission power of the local station to a lower limit. Meanwhile, similarly to the second embodiment, when the wireless terminal is being connected to a femtocell of the local station, the downlink transmission power setting section 1106 sets the downlink transmission power of the local station to a minimum value within a range in which the connection to the wireless terminal is maintained. In addition, the downlink transmission power setting section 1106 may set the amount of reduction in the downlink transmission power, in accordance with the difference between RSRP of the local station input from the wireless receiving section 1102 and desired adjacent RSRP. The transmission power value which is set by the downlink transmission power setting section 1106 is output to the transmission section 1107.

Figure 12:
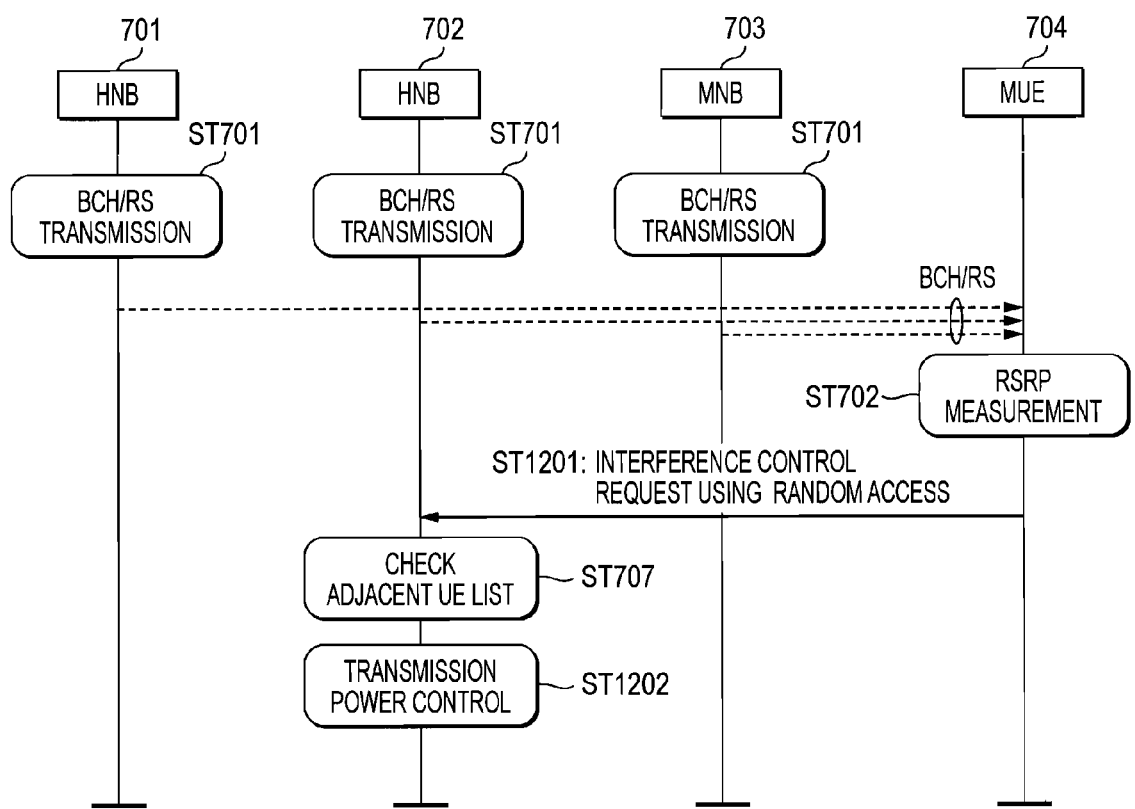
FIG. 12 is a sequence diagram illustrating an example of operations of the wireless communication system according to the fifth embodiment.
Figure 14:
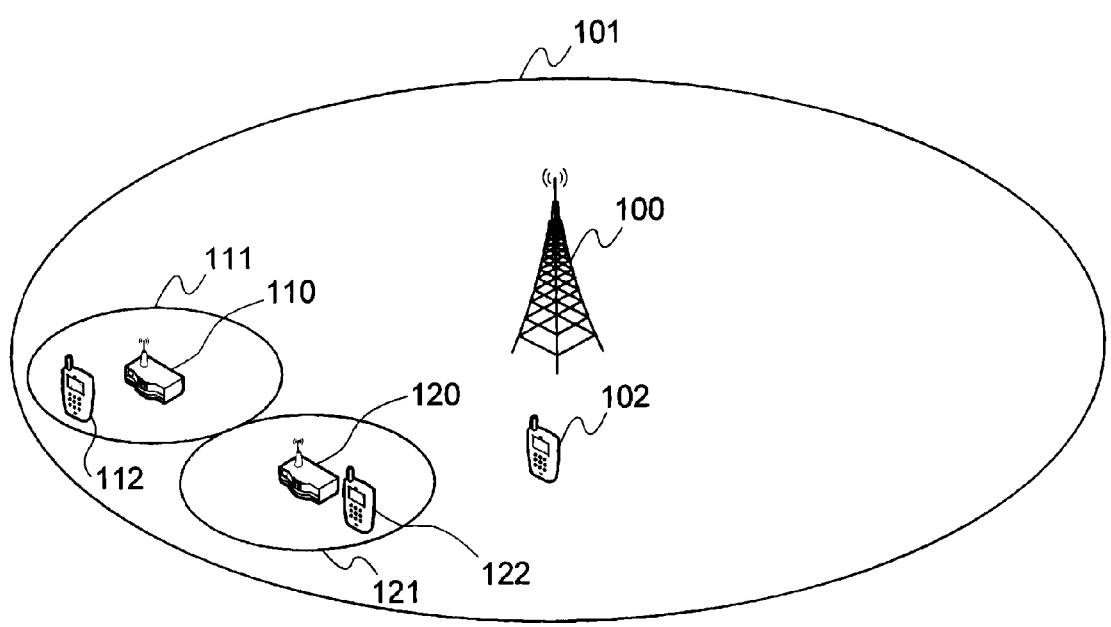
FIG. 14 is a diagram illustrating an example of a configuration of a wireless system in which femtocell base stations are installed within a coverage area of a macrocell base station.
Figure 15:
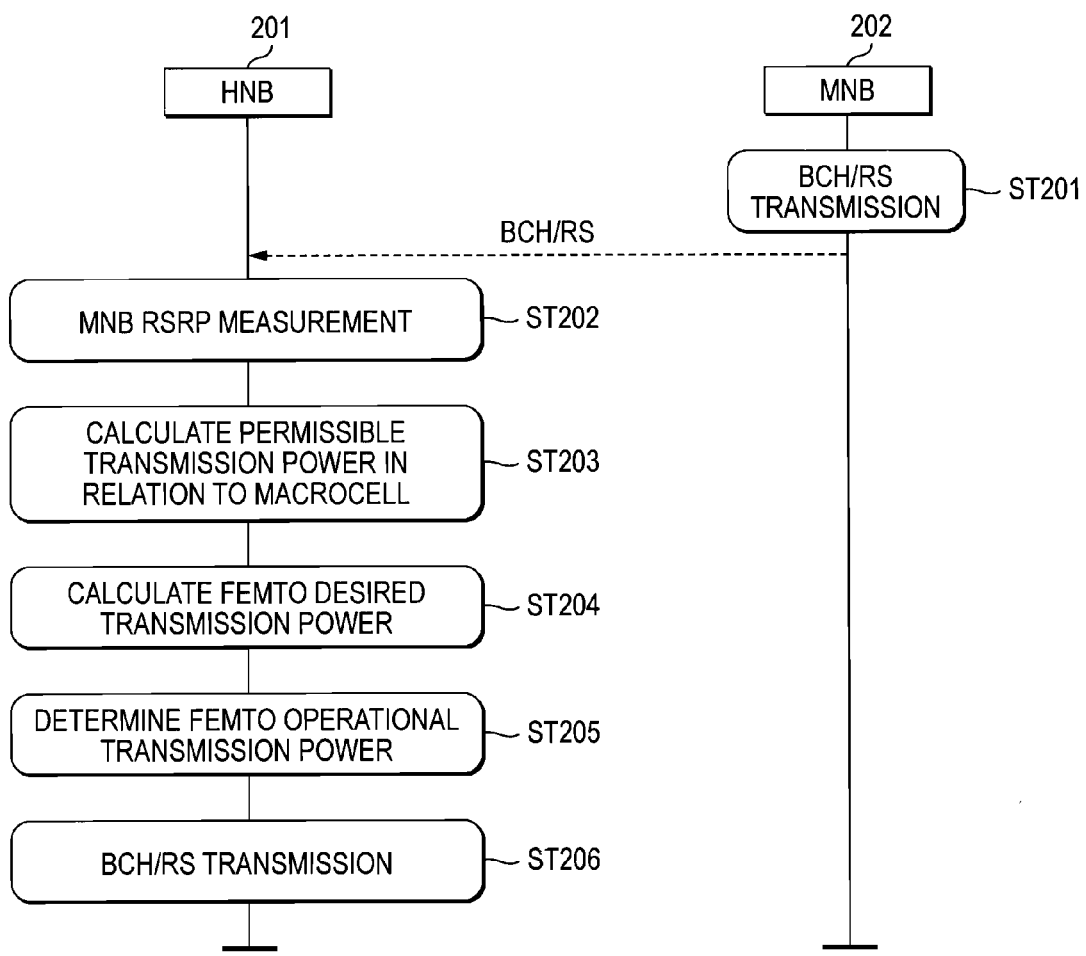
FIG. 15 is a sequence diagram of an interference control method disclosed in NPL 1.
Figure 16:
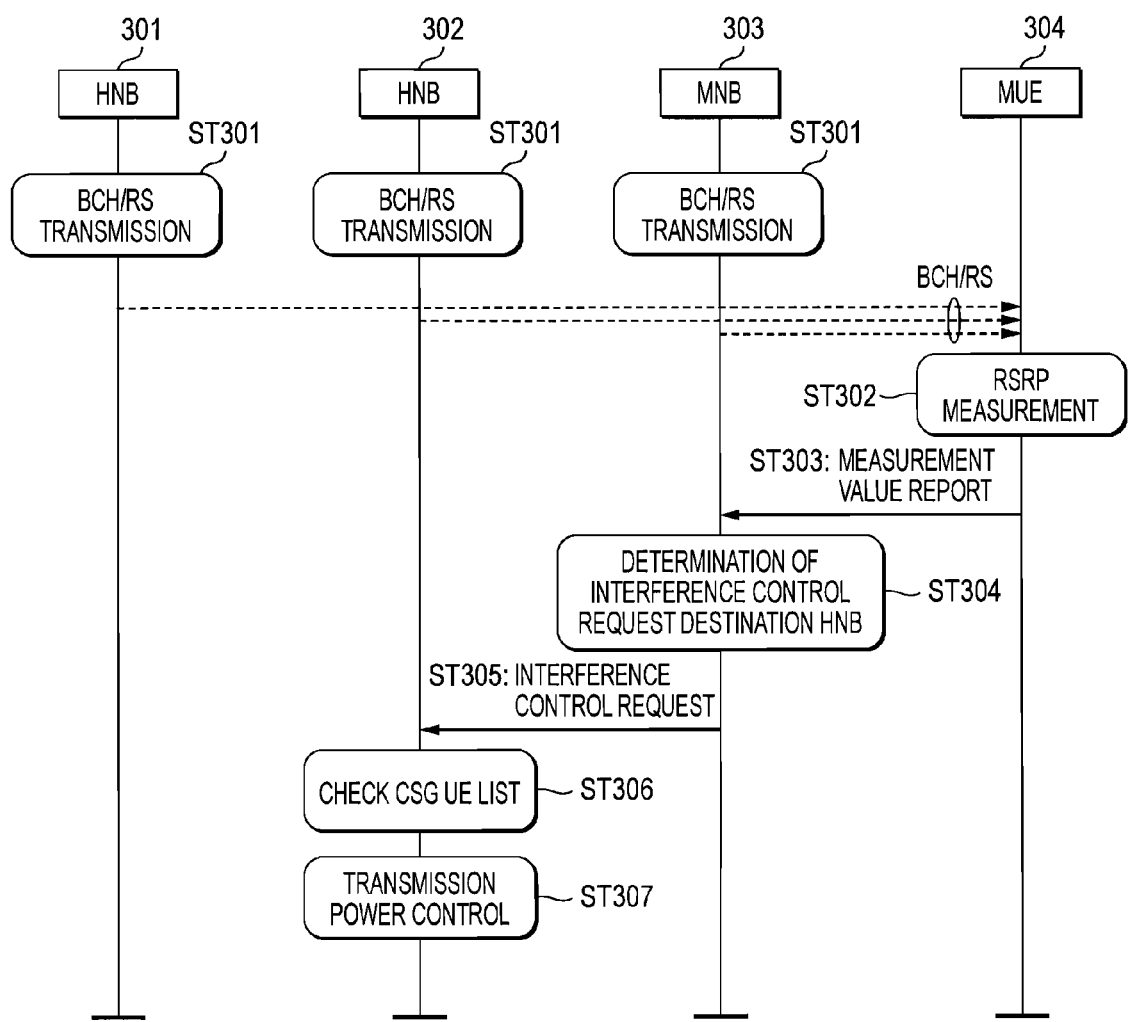
FIG. 16 is a sequence diagram of an interference control method disclosed in NPL 2.

FIG. 12 is a sequence diagram illustrating an example of operations of a wireless communication system according to the fifth embodiment. In FIG. 12, the same or equivalent parts as or to the steps of the sequence of the first embodiment are designated by the same reference signs or equivalent reference signs, and the description thereof will be simplified or omitted.

In step ST1201, the wireless terminal (UE) 704 transmits an interference control request to the femtocell base station 702 which is an interference source, using a random access channel of an uplink wireless line. The interference control request includes at least an identifier of the wireless terminal (UE) 704. Meanwhile, the interference control request may include RSRP of the femtocell base station (HNB) 702 which is a transmission destination of the interference control request and desired adjacent RSRP.

In step ST1202, when it is determined in step ST707 that the identifier of the wireless terminal included in the interference control request is included in the adjacent UE list held by the local station, the femtocell base station (HNB) 702 sets the downlink transmission power to a minimum value within a range in which the connection to the wireless terminal is maintained. In addition, the femtocell base station (HNB) 702 may set the amount of reduction in the downlink transmission power, in accordance with the difference between local station RSRP input from the wireless receiving section 1102 between desired adjacent RSRP.

As describe above, according to the fifth embodiment, when the downlink reference signal received power from the femtocell base station located in the vicinity of the femtocell base station to which the wireless terminal is capable of being connected is maximum, and the identifier of the femtocell base station is included in the peripheral femtocell list held in the wireless terminal, the wireless terminal transmits the interference control request to the femtocell base station using a random access. For this reason, it is possible to improve connectivity to the adjacent femtocell base station of the wireless terminal capable of being connected to the adjacent femtocell base station, while suppressing the used amount of the uplink wireless line without exchanging control information between the macrocell base station and the femtocell base station.

Other Embodiments (1) In the fifth embodiment, when the wireless terminal 1000 comes close to a first connectable femtocell base station 1020 during the connection to the macrocell base station 510, the interference control request is transmitted to a second femtocell cell base station 1020, having no connection permission, which is located in the vicinity of the first femtocell base station 1020 using a random access channel, and thus transmission power of the second femtocell base station 1020 is reduced. In addition to this, after the wireless terminal 1000 is handed over and is connected to the first connectable femtocell base station 1020, the random access to the second femtocell base station 1020 having no connection permission is restricted. It is possible to obtain an effect that an uplink wireless resource is not used more than necessary by prohibiting transmission of the interference control request due to a frequent random access from a wireless terminal of an adjacent room.

(2) In each of the above-mentioned embodiments, immediately before the wireless terminal which is being connected to the macrocell base station is connected to the connectable adjacent femtocell base station, the local station femtocell base station receives the interference control request to perform a reduction in the transmission power, and thus connectivity to the adjacent femtocell base station is improved. When the wireless terminal goes out from indoors, the femtocell base station performs a reduction in the transmission power similarly to the case of the connection to the macrocell base station, thereby also allowing connectivity to the macrocell base station to be improved. When the wireless terminal goes out from indoors, the reference signal received power of the connectable femtocell base station performing the measurement at fixed intervals, the non-connectable femtocell base station, and the macrocell base station is compared with each other, the non-connectable femtocell base station performs a reduction in the transmission power only when the received power values of the macrocell base station and the non-connectable femtocell base station are a predetermined value or more capable of handover. Meanwhile, the received power value of a neighboring cell by the wireless terminal is reported to the femtocell base station which is a serving cell, and the serving femtocell base station outputs the interference control request to the adjacent femtocell base station in a wired manner. Alternatively, similarly to the fifth embodiment, the wireless terminal may directly transmit the interference control request to the non-connectable femtocell base station vicinally located, using a random access channel.

FIG. 13 is a conceptual diagram illustrating a data configuration of an interference control request. As shown in FIG. 13, the interference control request includes a message type, an ID of an interference control request destination HNB, an ID of an interference control request source macrocell terminal, RSRP of an interference control request destination HNB, and RSRP of a macrocell terminal connectable HNB.

The message type is a bit string indicating the interference control request. The ID of the interference control request destination HNB is identification information of a destination HNB of the message sent from the macrocell base station (MNB). The ID of the interference control request source macrocell terminal is identification information of the macrocell terminal sending RSRP which is a source of the message. Meanwhile, the information is used for reference of the adjacent UE list described later.

RSRP of the interference control request destination HNB is received power obtained by measuring a reference signal (RS), transmitted from the femtocell base station (HNB) trying to receive an interference control, by the interference control request source macrocell terminal. RSRP of the macrocell terminal connectable HNB is a received power value of RS from HNB (home HNB) to which the macrocell terminal is capable of being connected. Meanwhile, RSRP of the interference control request destination HNB and RSRP of the macrocell terminal connectable HNB are included in the interference control requests of the first embodiment, the second and the third embodiment, but may not be included in that of the fourth embodiment.

Meanwhile, in each of the above-mentioned embodiments, the term "adjacent" not only includes a case where the femtocell base station is physically adjacent, but also includes all of the positional relationship capable of causing interference by sharing a radiowave frequency. For example, with respect to a case of a vertical positional relationship, or a case of presence of another femtocell base station, when interference can be caused in both cases, the femtocell base station is "adjacent".

In each of the above-mentioned embodiments, although a case where the present invention is configured by hardware has been described as an example, the present invention can also be realized by software.

In addition, each of the functional blocks used in the description of each of the above-mentioned embodiments is typically realized as LSIs which are integrated circuits. These may be individually formed in one chip, and may be formed in one chip so as to include a portion or all of them. LSI is used herein, but it is sometimes called an IC, a system LSI, a super LSI, and an ultra LSI, due to the difference of the degree of integration.

In addition, a technique of circuit integration is not limited to an LSI, but may be realized by a dedicated circuit or a general-purpose processor. After manufacturing of an LSI, field programmable gate array (FPGA) or a reconfigurable processor capable of reconfiguring the connection or setting of circuit cells inside an LSI may be used.

Further, when a technique of circuit integration appears in which replacement by an LSI is performed through progress of a semiconductor technique or a developed separate technique, integration of the functional blocks may be naturally performed using the technique. Biotechnology may be possibly applied.

Although the present invention has been described in detail with reference to specific embodiments, it will be obvious by those skilled in the art that various changes and modifications can be made without departing from the spirit and scope of the present invention.

This application claims the benefit of Japanese Patent Application 2010-070459, filed on Mar. 25, 2010, the contents of which are incorporated herein by reference.

INDUSTRIAL APPLICABILITY

A femtocell base station according to the present invention is useful for a wireless base station capable of reducing interference of a downlink wireless line between adjacent femtocell base stations.

REFERENCE SIGNS LIST 500 wireless terminal (UE)
510 macrocell base station (MNB)
520 femtocell base station (HNB)
501 receiving section
502 measurement section
503 transmission section
511 receiving section
512 control section
513 transmission section
521 receiving section
522 interference control section
523 transmission section
610 antenna
521 receiving section
522 interference control section
523 transmission section
611 wired receiving section
612 wireless receiving section
613 received power measurement section
614 storage section
615 UE determination section
616 downlink transmission power setting section
701, 702 femtocell base station (HNB)
703 macrocell base station (MNB)
704 wireless terminal (MUE)
820 femtocell base station (HNB)
800 femtocell wireless terminal (HUE)
901 femtocell wireless terminal (HUE)
1000 wireless terminal (UE)
1020 femtocell base station (HNB)
1001 storage section
1002 receiving section
1003 measurement section
1004 transmission section
1021 receiving section
1022 interference control section
1023 transmission section
1101 receiving section
1103 interference control section
1107 transmission section
1102 wireless receiving section
1104 storage section
1105 UE determination section
1106 downlink transmission power setting section

The invention claimed is:

1. A wireless communication system comprising:
a macrocell base station;
a plurality of femtocell base stations which are configured to communicate with the macrocell base station; and
a wireless terminal which is configured to wirelessly communicate with the macrocell base station and at least one of the plurality of femtocell base stations,
wherein the wireless terminal transmits a result of measuring received power of a downlink wireless signal from a femtocell base station of the plurality of femtocell base stations located in a vicinity of the wireless terminal to the macrocell base station;
wherein the macrocell base station transmits an interference control request including identification information of the wireless terminal to a group of the plurality of femtocell base stations of which the received power of the downlink wireless signal included in a measurement result transmitted from the wireless terminal is a predetermined value or more; and
wherein the femtocell base station has an adjacent wireless terminal list in which identification information of a wireless terminal, which is configured to be connected to an adjacent femtocell base station adjacent to the femtocell base station but is not configured to be connected to the femtocell base station, is recorded, and reduces downlink transmission power when the identification information of the wireless terminal included in the interference control request is included in the adjacent wireless terminal list.

2. The wireless communication system according to claim 1, wherein the femtocell base station has a local station wireless terminal list in which identification information of a wireless terminal capable of being connected to the femtocell base station is recorded; and
wherein the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

3. The wireless communication system according to claim 1, wherein a received power value of a downlink wireless signal from each station included in the femtocell base station group to the wireless terminal is included in the interference control request; and
wherein the femtocell base station refers to the interference control request, and reduces the downlink transmission power of the femtocell base station when the received power of the downlink wireless signal from the femtocell base station to the wireless terminal is larger than the received power of the downlink wireless signal from the adjacent femtocell base station to the wireless terminal.

4. The wireless communication system according to claim 3, wherein the femtocell base station further reduces the downlink transmission power thereof only when the identification information of the wireless terminal included in the interference control request is not included in the local station wireless terminal list, and both the received power of the downlink wireless signal from the femtocell base station to the wireless terminal and the received power of the downlink wireless signal from the adjacent femtocell base station to the wireless terminal are a predetermined value or more.

5. The wireless communication system according to claim 1, wherein the femtocell base station reduces the downlink transmission power thereof in a range in which a connection to the wireless terminal which is being connected to the femtocell base station is maintained.

6. The wireless communication system according to claim 1, wherein the femtocell base station reduces the downlink transmission power thereof when the received power of the downlink wireless signal from the femtocell base station to the wireless terminal increases.

7. The wireless communication system according to claim 1, wherein the wireless terminal has an adjacent femtocell base station list in which identification information of a femtocell base station adjacent to a femtocell base station to which the wireless terminal is capable of being connected is recorded; and wherein only in a case where a first received power value of the downlink wireless signal from the femtocell base station, to which the wireless terminal is capable of being connected, to the wireless terminal and a second received power value of the downlink wireless signal from the femtocell base station included in the adjacent femtocell base station list to the wireless terminal are a predetermined value or more, and the second received power value is larger than the first received power value, the wireless terminal transmits the first received power value and the second received power value to the macrocell base station.

8. A wireless communication system comprising:
a plurality of femtocell base stations; and
a wireless terminal which is configured to communicate with at least one of the plurality of femtocell base stations,
wherein the wireless terminal transmits an interference control request, including identification information of the wireless terminal to a femtocell base station having maximum received power in received powers of downlink wireless signals from femtocell base stations located in the vicinity of the wireless terminal and located in the vicinity of a femtocell base station to which the wireless terminal is configured to be connected;
wherein the femtocell base station has an adjacent wireless terminal list in which identification information of a wireless terminal, which is configured to be connected to an adjacent femtocell base station adjacent to the femtocell base station but is not configured to be connected to the femtocell base station, is recorded; and
wherein the femtocell base station reduces downlink transmission power thereof when the identification information of the wireless terminal included in the interference control request is included in the adjacent wireless terminal list.

9. A femtocell base station which is configured to communicate with a wireless terminal and a macrocell base station which is configured to communicate with the wireless terminal, the femtocell base station comprising:
an adjacent wireless terminal list in which identification information of a wireless terminal, which is configured to be connected to an adjacent femtocell base station adjacent to the femtocell base station but is not configured to be connected to the femtocell base station, is recorded,
wherein downlink transmission power of a local station is reduced when identification information of a wireless terminal included in an interference control request transmitted from the wireless terminal or the macrocell base station is included in the adjacent wireless terminal list.

10. The femtocell base station according to claim 9, further comprising:
a local station wireless terminal list in which identification information of a wireless terminal capable of being connected to the femtocell base station is recorded,
wherein the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

11. The femtocell base station according to claim 9, wherein a received power value of a downlink wireless signal from each station included in the femtocell base station group to the wireless terminal is included in the interference control request; and
wherein the downlink transmission power of the femtocell base station is reduced, with reference to the interference control request, when the received power of the downlink wireless signal from the femtocell base station to the wireless terminal is larger than the received power of the downlink wireless signal from the adjacent femtocell base station to the wireless terminal.

12. The femtocell base station according to claim 11, wherein the downlink transmission power of the femtocell base station is further reduced only when the identification information of the wireless terminal included in the interference control request is not included in the femtocell base station wireless terminal list, and both the received power of the downlink wireless signal from the femtocell base station to the wireless terminal and the received power of the downlink wireless signal from the adjacent femtocell base station to the wireless terminal are a predetermined value or more.

13. The femtocell base station according to claim 9, wherein the downlink transmission power is reduced in a range in which a connection to the wireless terminal which is being connected to the femtocell base station is maintained.

14. The femtocell base station according to claim 9, wherein the downlink transmission power of the femtocell base station is reduced when the received power of the downlink wireless signal from the femtocell base station to the wireless terminal increases.

15. A transmission power control method performed by a femtocell base station which is configured to communicate with a wireless terminal and a macrocell base station configured to communicate with the wireless terminal, wherein the femtocell base station having an adjacent wireless terminal list in which identification information of a wireless terminal, which is configured to be connected to an adjacent femtocell base station adjacent to the femtocell base station but is not configured to be connected to the femtocell base station, is recorded, reduces downlink transmission power when identification information of a wireless terminal included in an interference control request transmitted from the wireless terminal or the macrocell base station is included in the adjacent wireless terminal list.

16. The transmission power control method according to claim 15, wherein the femtocell base station has a local station wireless terminal list in which identification information of a wireless terminal capable of being connected to the femtocell base station is recorded; and wherein the amount of reduction in downlink transmission power performed by the femtocell base station is larger in a case where the identification information of the wireless terminal is included in the adjacent wireless terminal list than in a case where the identification information of the wireless terminal included in the interference control request is not included in any of the local station wireless terminal list and the adjacent wireless terminal list.

17. The transmission power control method according to claim 15, wherein a received power value of a downlink wireless signal from each station included in the femtocell base station group to the wireless terminal is included in the interference control request; and wherein the femtocell base station refers to the interference control request, and reduces the downlink transmission power of the femtocell base station when the received power of the downlink wireless signal from the femtocell base station to the wireless terminal is larger than the received power of the downlink wireless signal from the adjacent femtocell base station to the wireless terminal.

18. The transmission power control method according to claim 17, wherein the femtocell base station further reduces the downlink transmission power of the femtocell base station only when the identification information of the wireless terminal included in the interference control request is not included in the local station wireless terminal list, and both the received power of the downlink wireless signal from the femtocell base station to the wireless terminal and the received power of the downlink wireless signal from the adjacent femtocell base station to the wireless terminal are a predetermined value or more.

19. The transmission power control method according to any one of claims 15 to 18, wherein the femtocell base station reduces the downlink transmission power in a range in which a connection to the wireless terminal which is being connected to the femtocell base station is maintained.

20. The transmission power control method according to claim 15, wherein the femtocell base station reduces the downlink transmission power of the femtocell base station when the received power of the downlink wireless signal from the femtocell base station to the wireless terminal increases.

* * * * *